US012703073B2

(12) United States Patent
Burnett et al.

(10) Patent No.: US 12,703,073 B2
(45) Date of Patent: Aug. 11, 2026

(54) SYSTEMS AND METHODS FOR IDENTIFICATION OF POWER TOOL ACCESSORIES

(71) Applicant: MILWAUKEE ELECTRIC TOOL CORPORATION, Brookfield, WI (US)

(72) Inventors: Luke T. Burnett, Chicago, IL (US); Luke J. Skinner, West Bend, WI (US); Timothy J. Radtke, Chicago, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 50 days.

(21) Appl. No.: 18/419,804

(22) Filed: Jan. 23, 2024

(65) Prior Publication Data

US 2024/0246215 A1 Jul. 25, 2024

Related U.S. Application Data

(60) Provisional application No. 63/481,406, filed on Jan. 25, 2023.

(51) Int. Cl.

*B25F 3/00* (2006.01)
*B21D 39/04* (2006.01)
*B25B 27/10* (2006.01)

(52) U.S. Cl.

CPC .............. *B25F 3/00* (2013.01); *B21D 39/048* (2013.01); *B25B 27/10* (2013.01)

(58) Field of Classification Search

CPC . B25F 3/00; B25F 5/00; B21D 39/048; B25B 27/10; B25H 3/003

USPC ................ 173/1–2, 29, 46, 50, 90, 171, 213

See application file for complete search history.

(56) References Cited

U.S. PATENT DOCUMENTS 3,746,106 A * 7/1973 McCullough ............. E21B 7/04 175/45
5,014,794 A 5/1991 Hansson
5,886,634 A * 3/1999 Muhme .............. G08B 13/2454 340/5.31
H1821 H * 12/1999 Kosinski ........................... 173/4
6,232,877 B1 * 5/2001 Ashwin .............. G08B 13/2462 340/568.1
6,822,559 B2 * 11/2004 Hofbeck ................. B60R 25/00 340/426.1

(Continued)

FOREIGN PATENT DOCUMENTS

CA 2844035 A1 * 9/2014 ....... A61B 17/07207
CN 107520818 A 12/2017

(Continued)

*Primary Examiner* — Robert F Long

(74) *Attorney, Agent, or Firm* — Michael Best & Friedrich LLP

(57) ABSTRACT

Systems and methods for identifying power tool accessories. Power tools described herein include a power tool housing including an interface. The interface is configured to receive an accessory. The accessory includes an identifier. The power also includes a motor and an electronic processor connected to the motor and a memory. The electronic processor is configured to detect insertion of the accessory into the interface and determine, when the accessory is inserted into the interface, an accessory type of the accessory based on the identifier. The electronic processor is configured to select operating parameters for the motor based on the accessory type.

16 Claims, 16 Drawing Sheets

(56) References Cited

U.S. PATENT DOCUMENTS

| | | | | |
|---|---|---|---|---|
| 7,205,894 | B1 * | 4/2007 | Savage | G08B 13/1427 340/568.1 |
| 7,431,682 | B2 | 10/2008 | Zeiler et al. | |
| 7,661,582 | B2 | 2/2010 | Möllstam | |
| 7,665,343 | B2 | 2/2010 | Ballas et al. | |
| 7,740,425 | B2 | 6/2010 | Zeiler et al. | |
| 7,778,118 | B2 * | 8/2010 | Lyons | G06F 3/0488 368/69 |
| 7,783,454 | B2 * | 8/2010 | Burrell | A61B 5/681 701/487 |
| 7,789,802 | B2 * | 9/2010 | Lee | A63B 24/0084 482/901 |
| 8,121,785 | B2 * | 2/2012 | Swisher | A63B 24/0075 701/423 |
| 8,529,567 | B2 | 9/2013 | Garcia et al. | |
| 8,746,547 | B2 | 6/2014 | Mollstam et al. | |
| 8,896,240 | B2 | 11/2014 | Dai et al. | |
| 8,978,517 | B2 * | 3/2015 | Meyers | B25B 17/00 81/3.2 |
| 9,089,952 | B2 | 7/2015 | Gatling et al. | |
| 9,367,062 | B2 | 6/2016 | Volpert | |
| 9,585,677 | B2 | 3/2017 | Garcia et al. | |
| 9,776,315 | B2 | 10/2017 | Cannaliato et al. | |
| 9,878,432 | B2 | 1/2018 | Linehan et al. | |
| 9,962,169 | B2 | 5/2018 | Garcia et al. | |
| 10,427,201 | B2 | 10/2019 | Bungter et al. | |
| 10,513,015 | B2 | 12/2019 | Lefavour et al. | |
| 10,646,987 | B2 | 5/2020 | Barezzani | |
| 10,710,223 | B2 | 7/2020 | Rosani | |
| 10,726,220 | B2 | 7/2020 | Hall et al. | |
| 10,784,641 | B2 | 9/2020 | Couch et al. | |
| 10,792,050 | B2 | 10/2020 | Garcia et al. | |
| 10,799,962 | B2 | 10/2020 | Barezzani et al. | |
| 10,894,310 | B2 | 1/2021 | Cannaliato et al. | |
| 11,148,211 | B2 | 10/2021 | Wachholz et al. | |
| 11,207,756 | B2 | 12/2021 | Dey, IV et al. | |
| 11,213,875 | B2 | 1/2022 | Ruch et al. | |
| 11,395,664 | B1 | 7/2022 | Ju et al. | |
| 11,611,186 | B2 | 3/2023 | Ruch et al. | |
| 2001/0052416 | A1 * | 12/2001 | Wissmach | B23Q 3/15546 173/4 |
| 2002/0134811 | A1 * | 9/2002 | Napier | B24B 23/04 227/134 |
| 2005/0100867 | A1 * | 5/2005 | Hilscher | A61C 17/222 15/22.1 |
| 2005/0219052 | A1 * | 10/2005 | Chaco | G07C 9/28 340/572.1 |
| 2006/0037766 | A1 * | 2/2006 | Gass | B23B 49/008 173/20 |
| 2006/0159533 | A1 * | 7/2006 | Zeiler | B23B 49/006 408/226 |
| 2006/0234617 | A1 | 10/2006 | Francis et al. | |
| 2007/0023193 | A1 * | 2/2007 | King | B25H 3/028 166/387 |
| 2007/0254778 | A1 * | 11/2007 | Ashby | A63B 24/0084 482/4 |
| 2008/0163767 | A1 * | 7/2008 | Wu Chang | A47J 19/027 99/492 |
| 2008/0185419 | A1 * | 8/2008 | Smith | A61B 17/115 227/179.1 |
| 2008/0204225 | A1 * | 8/2008 | Kitchen | A63B 21/072 340/539.22 |
| 2008/0276678 | A1 | 11/2008 | Pacaud et al. | |
| 2008/0312041 | A1 * | 12/2008 | Schwabe | G16H 40/63 482/8 |
| 2010/0005691 | A1 | 1/2010 | Ballas et al. | |
| 2011/0257635 | A1 * | 10/2011 | Whitman | A61B 17/00 606/1 |
| 2012/0168188 | A1 * | 7/2012 | Eckert | B25B 21/00 173/1 |
| 2012/0168189 | A1 * | 7/2012 | Eckert | B25B 21/00 173/1 |
| 2012/0182124 | A1 * | 7/2012 | Joannes | G07C 9/28 340/5.65 |
| 2013/0331895 | A1 | 12/2013 | Garcia et al. | |
| 2014/0226295 | A1 * | 8/2014 | Nishio | H05K 5/0039 361/759 |
| 2015/0014004 | A1 * | 1/2015 | Schubert | B23B 49/00 173/1 |
| 2015/0286209 | A1 * | 10/2015 | Kreuzer | B25F 5/00 700/175 |
| 2015/0306747 | A1 | 10/2015 | Theureaux et al. | |
| 2016/0091393 | A1 * | 3/2016 | Liao | G01M 13/00 702/34 |
| 2016/0108598 | A1 * | 4/2016 | Waxse | E02D 7/06 702/33 |
| 2016/0167186 | A1 | 6/2016 | Chan et al. | |
| 2016/0171903 | A1 * | 6/2016 | Grossman | G06T 19/006 434/238 |
| 2016/0278558 | A1 * | 9/2016 | Ansari | A47G 29/121 |
| 2016/0363510 | A1 * | 12/2016 | Kanack | B25B 27/10 |
| 2016/0364687 | A1 * | 12/2016 | Matson | G06Q 10/087 |
| 2017/0123399 | A1 * | 5/2017 | Londo | G05B 19/048 |
| 2017/0190041 | A1 * | 7/2017 | Dey, IV | F16F 9/535 |
| 2017/0276572 | A1 * | 9/2017 | Chen | G01M 99/005 |
| 2018/0085763 | A1 | 3/2018 | Leckner | |
| 2018/0161890 | A1 | 6/2018 | Barezzani et al. | |
| 2018/0188284 | A1 * | 7/2018 | Douglas | G06V 40/23 |
| 2018/0354114 | A1 * | 12/2018 | Bantle | B25B 21/02 |
| 2019/0059888 | A1 * | 2/2019 | Shelton, IV | A61B 17/0684 |
| 2019/0061135 | A1 * | 2/2019 | Cerfeuillet | F21V 33/0084 |
| 2019/0160643 | A1 | 5/2019 | Lefavour et al. | |
| 2019/0201034 | A1 * | 7/2019 | Shelton, IV | A61B 17/320016 |
| 2019/0217459 | A1 | 7/2019 | Gregorich et al. | |
| 2019/0217460 | A1 * | 7/2019 | Mahalingappa | B25F 5/02 |
| 2019/0232481 | A1 * | 8/2019 | Skinner | B25B 27/10 |
| 2019/0308309 | A1 | 10/2019 | Gregorich et al. | |
| 2019/0326720 | A1 * | 10/2019 | Kelly | H01R 4/183 |
| 2020/0184248 | A1 * | 6/2020 | Donhowe | A61B 34/25 |
| 2020/0206888 | A1 | 7/2020 | Barezzani | |
| 2020/0223050 | A1 * | 7/2020 | Smith | B25F 5/00 |
| 2020/0260643 | A1 | 8/2020 | Hata et al. | |
| 2020/0260644 | A1 | 8/2020 | Ichikawa | |
| 2020/0272124 | A1 * | 8/2020 | Kreuzer | G07C 9/38 |
| 2020/0306927 | A1 * | 10/2020 | Tanikella | G06N 20/00 |
| 2020/0405302 | A1 * | 12/2020 | Shelton, IV | A61B 90/96 |
| 2021/0062942 | A1 * | 3/2021 | Besser | F16L 13/141 |
| 2021/0169191 | A1 * | 6/2021 | Mannarelli | A45C 3/06 |
| 2021/0170563 | A1 | 6/2021 | Cannaliato et al. | |
| 2021/0205976 | A1 | 7/2021 | Matei | |
| 2021/0245353 | A1 * | 8/2021 | Crowell | B25F 5/00 |
| 2021/0328399 | A1 | 10/2021 | Radtke et al. | |
| 2021/0347002 | A1 * | 11/2021 | Gallo | B23Q 11/0085 |
| 2022/0102995 | A1 * | 3/2022 | Fieldbinder | H02J 7/00036 |
| 2022/0104820 | A1 * | 4/2022 | Shelton, IV | A61B 17/07207 |
| 2022/0111478 | A1 | 4/2022 | Dey, IV et al. | |
| 2022/0193874 | A1 * | 6/2022 | Ramezanian | B25F 5/006 |
| 2022/0272898 | A1 | 9/2022 | Larsén | |
| 2022/0288754 | A1 * | 9/2022 | Zhou | B25B 28/00 |
| 2022/0407274 | A1 * | 12/2022 | Radtke | H01R 43/0428 |
| 2023/0015954 | A1 * | 1/2023 | Schneider | B25B 21/026 |
| 2023/0256498 | A1 | 8/2023 | Wekwert et al. | |
| 2024/0106180 | A1 | 3/2024 | Radtke et al. | |
| 2024/0144734 | A1 * | 5/2024 | Kreischer | G06V 20/64 |
| 2024/0246219 | A1 * | 7/2024 | Skinner | B25H 3/003 |
| 2024/0273985 | A1 * | 8/2024 | Turner | G08B 13/2405 |
| 2024/0326207 | A1 * | 10/2024 | Kaye, Jr. | B25B 27/10 |
| 2024/0349232 | A1 * | 10/2024 | White, Jr. | B25F 5/00 |
| 2025/0110217 | A1 * | 4/2025 | He | G01S 7/497 |
| 2025/0134523 | A1 * | 5/2025 | Hart | A61B 17/1155 |
| 2025/0135622 | A1 * | 5/2025 | Davis | B25B 23/1425 |

FOREIGN PATENT DOCUMENTS

| | | | | |
|---|---|---|---|---|
| CN | 106457540 B | * 12/2019 | B25F 5/008 |
| CN | 214980792 U | 12/2021 | |
| CN | 114502306 B | * 6/2024 | B25B 27/10 |
| DE | DD-232661 A1 | * 2/1986 | |
| DE | 102012202116 A1 | 8/2013 | |
| DE | 102016218775 A1 | 3/2018 | |

(56) References Cited

FOREIGN PATENT DOCUMENTS

| | | | | | |
|---|---|---|---|---|---|
| DE | 102017107737 | A1 | | 10/2018 | |
| DE | 102018201006 | A1 | | 7/2019 | |
| DE | 202022101816 | U1 | * | 4/2022 | B25F 5/00 |
| DE | 112022002592 | T5 | * | 3/2024 | B25F 5/00 |
| DE | 112022003492 | T5 | * | 5/2024 | H01R 43/0427 |
| EP | 3375571 | B1 | * | 7/2023 | B25B 21/00 |
| JP | 2008087094 | A | * | 4/2008 | |
| JP | 2019206073 | A | | 12/2019 | |
| JP | 2023549306 | A | * | 11/2023 | |
| KR | 101672807 | B1 | * | 11/2016 | B23Q 17/24 |
| WO | WO-03019301 | A2 | * | 3/2003 | G05B 19/4065 |
| WO | 2017107050 | A1 | | 6/2017 | |
| WO | 2019014880 | A1 | | 1/2019 | |
| WO | 2021244790 | A1 | | 12/2021 | |
| WO | 2022083559 | A1 | | 4/2022 | |
| WO | 2022136092 | A1 | | 6/2022 | |
| WO | WO-2023039142 | A1 | * | 3/2023 | B25F 5/00 |
| WO | WO-2024254691 | A1 | * | 12/2024 | A61B 34/30 |

* cited by examiner

SYSTEMS AND METHODS FOR IDENTIFICATION OF POWER TOOL ACCESSORIES

RELATED APPLICATIONS

This application claims priority to and the benefit of U.S. Provisional Patent Application No. 63/481,406, filed Jan. 25, 2023, the entire contents of which are hereby incorporated by reference.

FIELD

This application relates to identifying power tool accessories, such as crimping dies.

SUMMARY

Example power tools described herein include a power tool housing including an interface. The interface is configured to receive an accessory. The accessory includes an identifier. The power tools also include a motor and an electronic processor connected to the motor and a memory. The electronic processor is configured to detect insertion of the accessory into the interface and determine, when the accessory is inserted into the interface, an accessory type of the accessory based on the identifier. The electronic processor is configured to select one or more operating parameters for the motor based on the accessory type.

In some aspects, the power tool includes a radio frequency identification reader, the identifier is a radio frequency identification tag, and the electronic processor is configured to determine the accessory type of the accessory based on the radio frequency identification tag of the accessory.

In some aspects, the accessory is one selected from the group consisting of a press ring, a crimping jaw, a crimping die, and a set of crimping jaws and crimping dies.

In some aspects, the identifier is a resistive element and the electronic processor is configured to determine the accessory type of the accessory by determining a resistance value of the resistive element.

In some aspects, the accessory is a first accessory and the electronic processor is further configured to detect insertion of a second accessory into the interface, the second accessory including a second identifier, determine, when the second accessory is inserted into the interface, an accessory type of the second accessory, determine whether the first accessory and the second accessory are mismatched based on the accessory type of the first accessory and the accessory type of the second accessory, and provide, in response to the first accessory and the second accessory being mismatched, a notification via an indicator.

In some aspects, the electronic processor is further configured to lock, in response to the first accessory and the second accessory being mismatched, operation of the motor.

In some aspects, the electronic processor is further configured to unlock, in response to receiving an override input, operation of the motor, and update, in response to receiving the override input, an accessory log indicating the first accessory and the second accessory are mismatched.

In some aspects, the operating parameters include at least one selected from the group consisting of a maximum motor speed, a minimum motor speed, a maximum motor current, a minimum motor current, and a set of operating functions for the motor.

In some aspects, the identifier is one selected from the group consisting of a color of the accessory, a pattern on the accessory, a radio frequency identification tag of the accessory, and a near field communication tag of the accessory.

In some aspects, the electronic processor is further configured to determine whether the accessory type is compatible with the power tool by comparing the accessory type to a look-up table, and stop, in response to determining the accessory type is not compatible with the power tool, operation of the motor.

Example methods described herein for operating a power tool include detecting insertion of an accessory into an interface. The accessory includes an identifier. The methods also include determining, when the accessory is inserted into the interface, an accessory type of the accessory based on the identifier. The method includes selecting operating parameters for the motor based on the accessory type.

In some aspects, the identifier is one selected from the group consisting of a radio frequency identification tag and a near field communication tag.

In some aspects, the identifier is a resistive element and determining the accessory type of the accessory based on the identifier includes determining a resistance value of the resistive element.

In some aspects, the accessory is a first accessory, and the method further comprises detection insertion of a second accessory into the interface, the second accessory including a second identifier, determining, when the second accessory is inserted into the interface, an accessory type of the second accessory, determining whether the first accessory and the second accessory are mismatched based on the accessory type of the first accessory and the accessory type of the second accessory, and providing, in response to the first accessory and the second accessory being mismatched, a notification via an indicator.

In some aspects, the method further comprises locking, in response to the first accessory and the second accessory being mismatched, operation of the motor.

In some aspects, the method further comprises unlocking, in response to receiving an override input, operation of the motor, and updating, in response to receiving the override input, an accessory log indicating the first accessory and the second accessory are mismatched.

Example power tools described herein include a power tool housing including an interface and an input device. The interface is configured to receive an accessory. The accessory includes an identifier. The power tools also include a motor and an electronic processor connected to the input device, the motor, and a memory. The electronic processor is configured to detect insertion of the accessory into the interface, and determine, when the accessory is inserted into the interface, an accessory type of the accessory based on the identifier. The electronic processor is configured to select an operating function for driving the motor based on the accessory type, and drive, in response to actuation of the input device, the motor to perform the operating function.

In some aspects, the operating function includes a period of time to drive the motor and a speed at which to drive the motor.

In some aspects, the accessory is a first accessory, and the electronic processor is further configured to detect insertion of a second accessory into the interface, the second accessory including a second identifier, determine, when the second accessory is inserted into the interface, an accessory type of the second accessory, determine whether the first accessory and the second accessory are mismatched based on the accessory type of the first accessory and the accessory type of the second accessory, and provide, in response to the first accessory and the second accessory being mismatched, a notification via an indicator.

In some aspects, the electronic processor is further configured to determine whether the accessory type is compatible with the power tool by comparing the accessory type to a look-up table, and stop, in response to determining the accessory type is not compatible with the power tool, operation of the motor.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

DETAILED DESCRIPTION

Figure 1A:
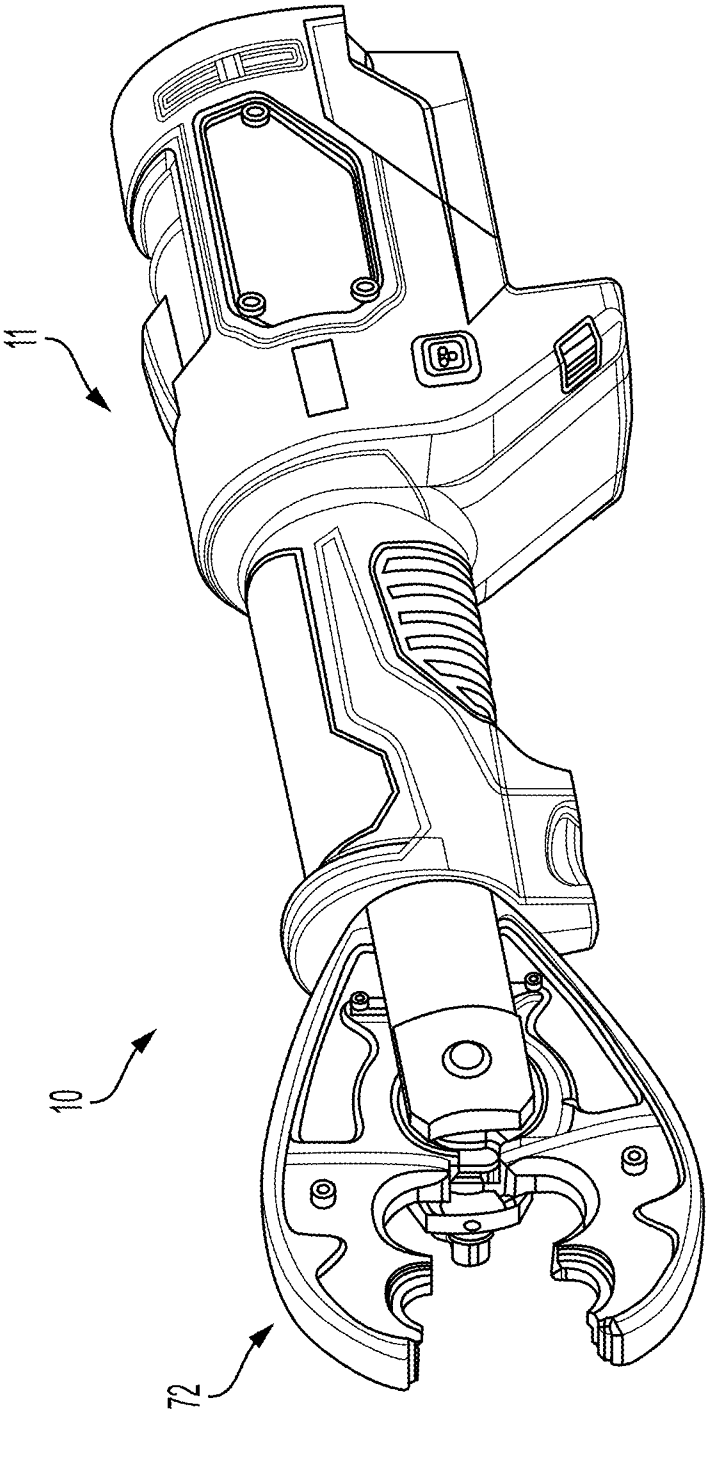
FIGS. 1A, 1B, and 1C are illustrate a power tool in accordance with embodiments described herein.
Figure 1B:
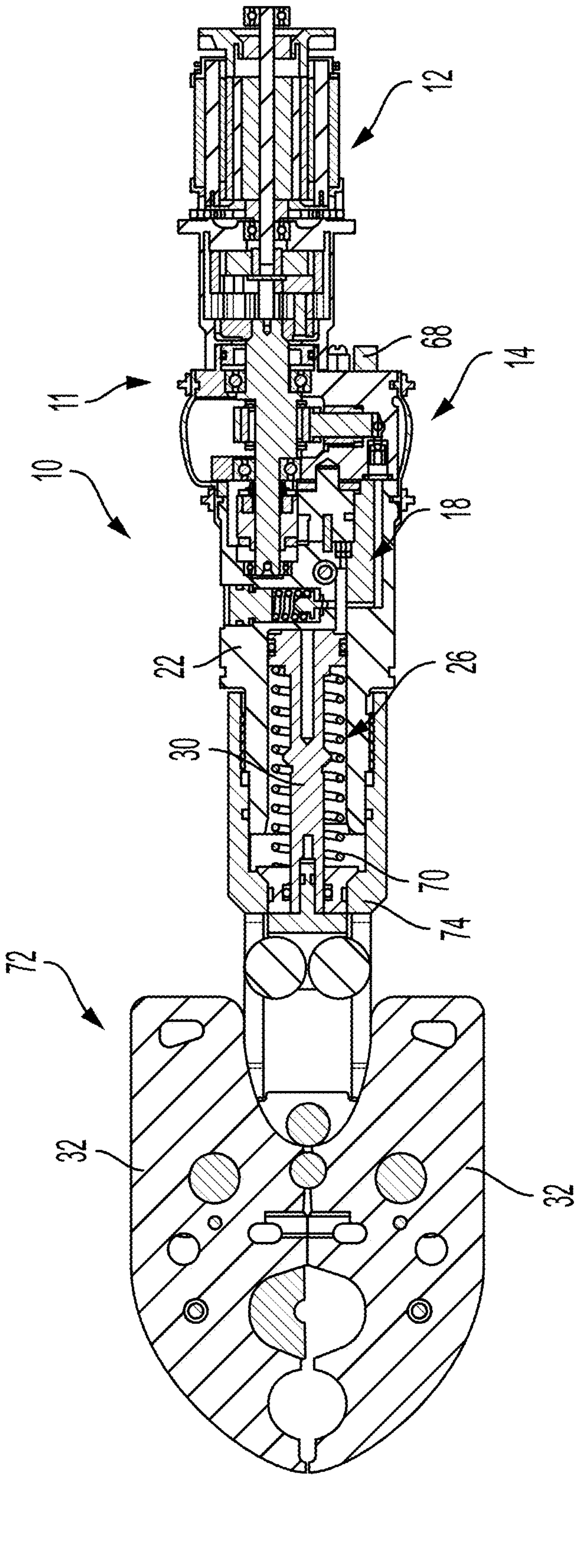
Figure 1C:
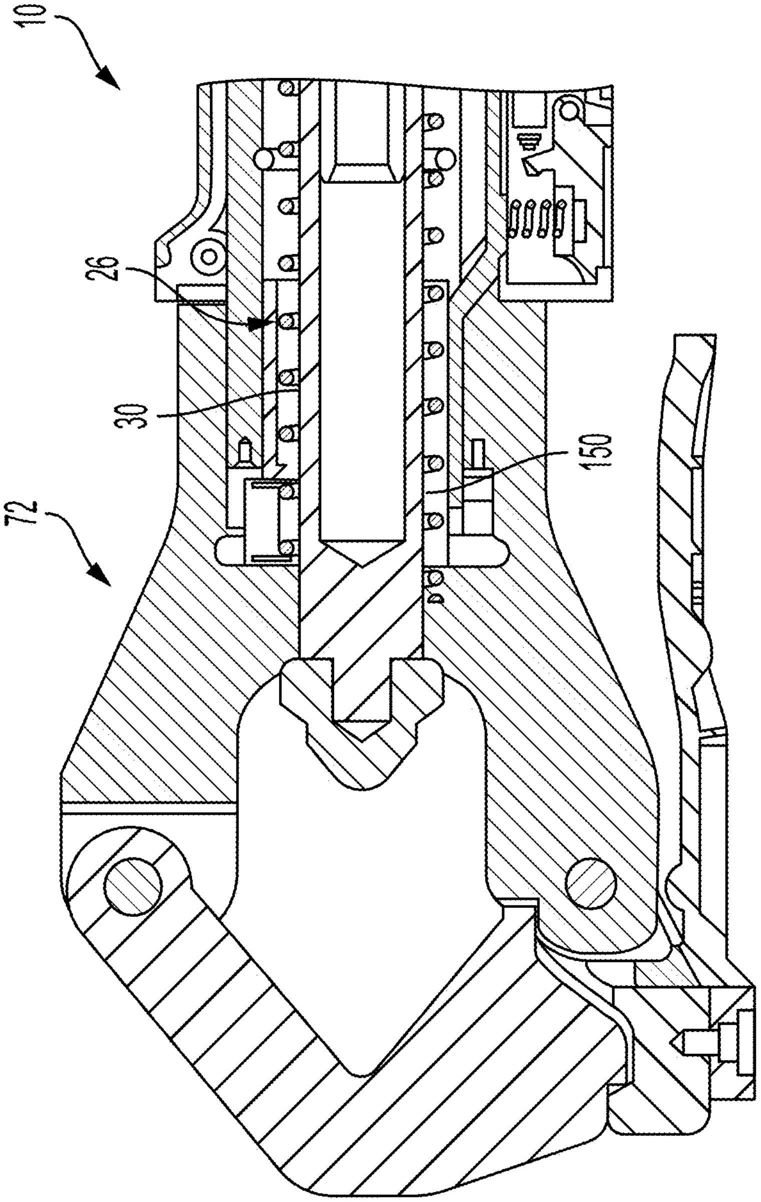

FIGS. 1A-1C illustrates an embodiment of a power tool 10, such as a crimper. The crimper includes a housing 11 which has been removed in FIG. 1B for illustrative purposes. The power tool 10 includes an electric motor 12, and a pump 14 driven by the motor 12. In some embodiments, the power tool 10 also includes a cylinder housing 22 defining a piston cylinder 26, and an extensible piston 30 disposed within the piston cylinder 26. The power tool 10 also includes electronic control and monitoring circuitry for controlling and/or monitoring various functions of the power tool 10. In some embodiments, the pump 14 causes the piston 30 to extend from the cylinder housing 22 and actuate a pair of jaws 32 for crimping a workpiece, such as a connector. The jaws 32 are a part of a crimper head 72, which also includes a clevis 74 for attaching the head 72 to the housing 11 of the power tool 10, which otherwise includes the motor 12, pump 14, cylinder housing 22, and piston 30.

Figure 2C:
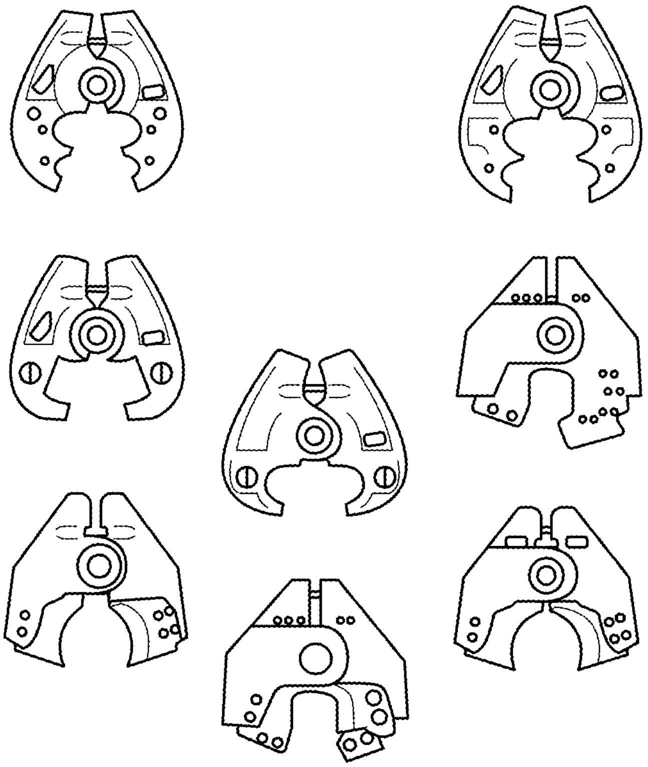
FIGS. 2A, 2B, and 2C are example accessories for the power tool of FIG. 1A in accordance with embodiments described herein.
Figure 2A:
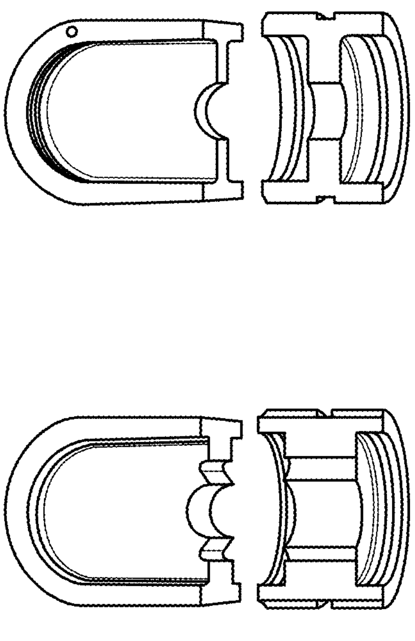
Figure 2B:
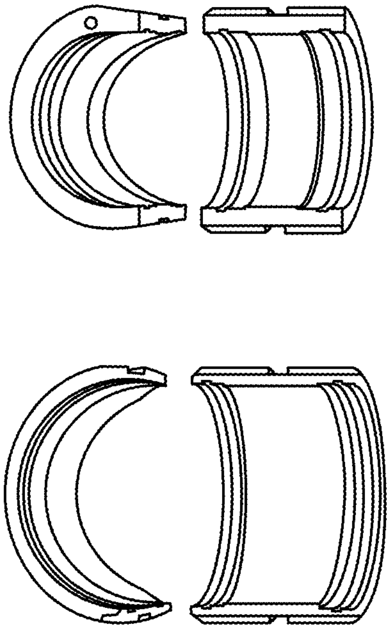

The power tool 10 may receive different types of accessories (e.g., a die, a jaw, a component, a component critical to tool function, etc.) depending on the size, shape, and material of the workpiece. For example, FIGS. 2A-2C provide example dies and jaws for the crimping head 72. The dies are received, for example, by an interface or recess included within the crimper head 72 or the cylinder housing 22. The dies can be used for electrical applications (e.g., wire and couplings), plumbing applications (e.g., pipe and couplings), and the like. The size of the dies depends on the size of a wire, pipe, coupling, etc., to be crimped. In some embodiments, die sizes include #8, #6, #4, #2, #1, 1/0, 2/0, 3/0, 4/0, 250 MCM, 300 MCM, 350 MCM, 400 MCM, 500 MCM, 600 MCM, 750 MCM, and 1000 MCM. The shape formed by the die can be circular or another shape. In some embodiments, the dies are configured to crimp various malleable materials and metals, such as copper (Cu) and aluminum (Al). Additionally, the dies can be removable to allow the power tool 10 to crimp different workpieces. The crimping head 72 may be configured to receive two dies that form a pair, such as an upper die and a lower die (e.g., a first accessory and a second accessory). In some embodiments, the power tool 10 may be a dieless crimper. In some instances, the jaws 32 forming the crimping head 72 are replaceable jaws that may be replaced by another accessory, such as cutting heads, jaws for press rings, or crimping jaws of another size.

Figure 3:
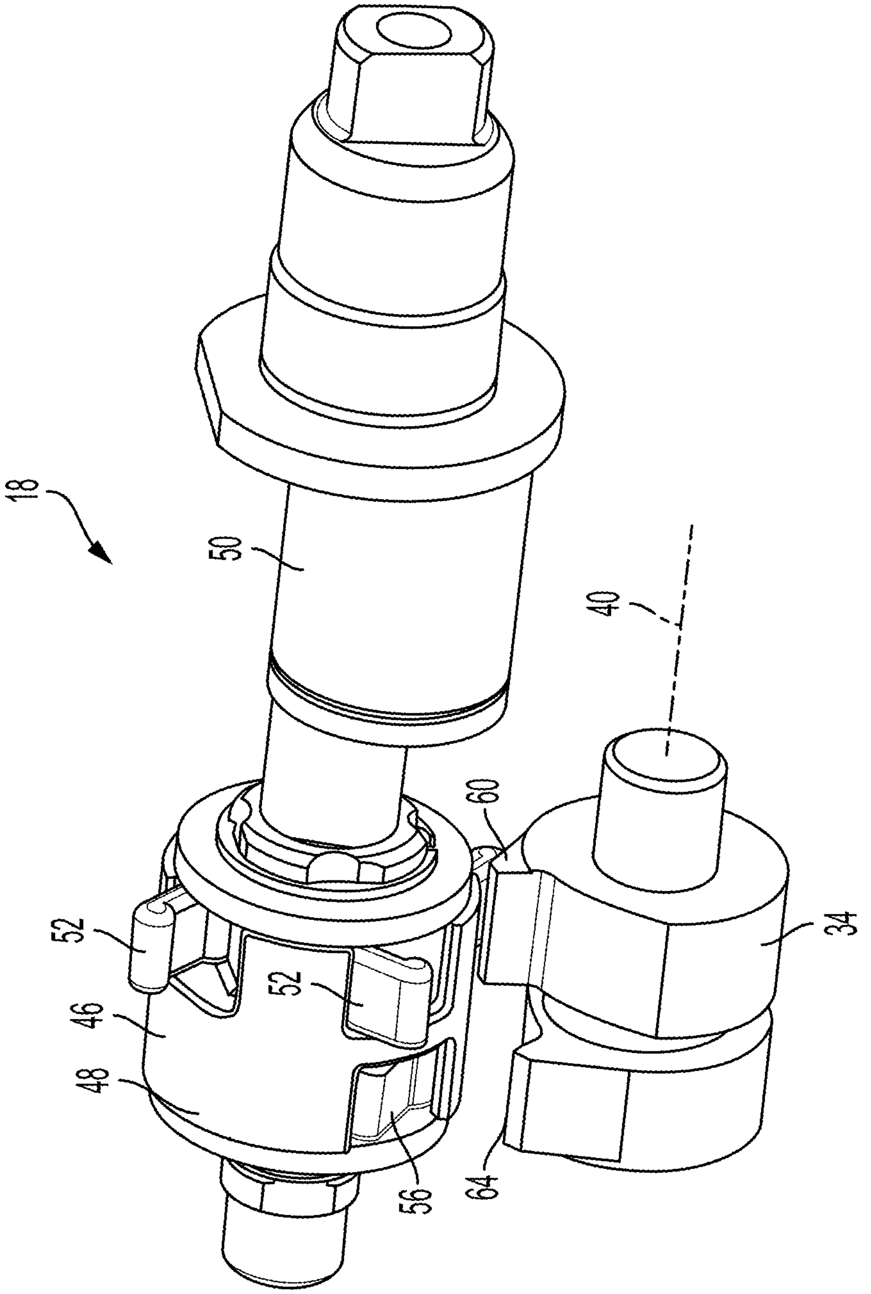
FIG. 3 is a perspective view of a rotary return valve of the power tool of FIG. 1A.

With reference to FIG. 3, in some instances, the assembly 18 also includes a valve actuator 46 driven by an input shaft 50 of the pump 14 for selectively closing the return valve 34 (e.g., when the return port 38 is misaligned with the return passageway 42) and opening the return valve 34 (e.g., when the return port 38 is aligned with the return passageway 42). The valve actuator 46 includes a generally cylindrical body 48 that accommodates a first set of pawls 52 and a second set of pawls 56. In other embodiments, the sets of pawls 52, 56 may include any other number of pawls.

The pawls 52, 56 are pivotally coupled to the body 48 and extend and retract from the body 48 in response to rotation of the input shaft 50. The pawls 52 extend when the input shaft 50 is driven in a clockwise direction, and the pawls 52 retract when the input shaft 50 is driven in a counter-clockwise direction. Conversely, the pawls 56 extend when the input shaft 50 is driven in the counter-clockwise direction, and retract when the input shaft 50 is driven in the clockwise direction. The pawls 52, 56 are selectively engageable with corresponding first and second radial projections 60, 64 on the return valve 34 to open and close the valve 34.

Figure 4:
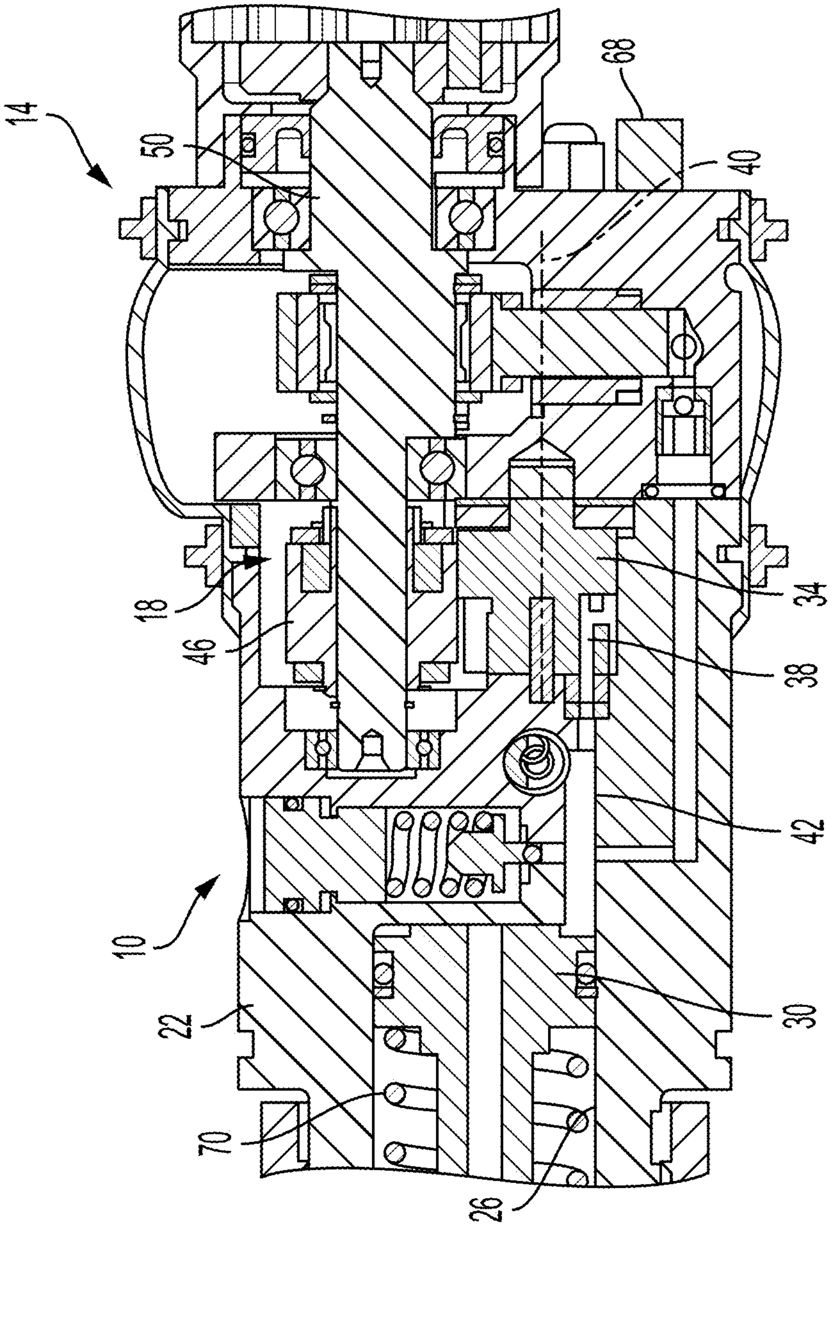
FIG. 4 is a portion of the power tool of FIG. 1A, illustrating the rotary return valve in an open position.

Prior to initiating a crimping operation, the return valve 34 is in an open position as shown in FIG. 4, in which the return port 38 is aligned with the return passageway 42 to fluidly communicate the piston cylinder 26 and the reservoir. In the open position, the pressure in the piston cylinder 26 is at approximately zero pounds per square inch (psi), the speed of the motor 12 is at zero revolutions per minute (rpm), and the current supplied to the motor 12 is zero amperes (A or amps).

Figure 5:
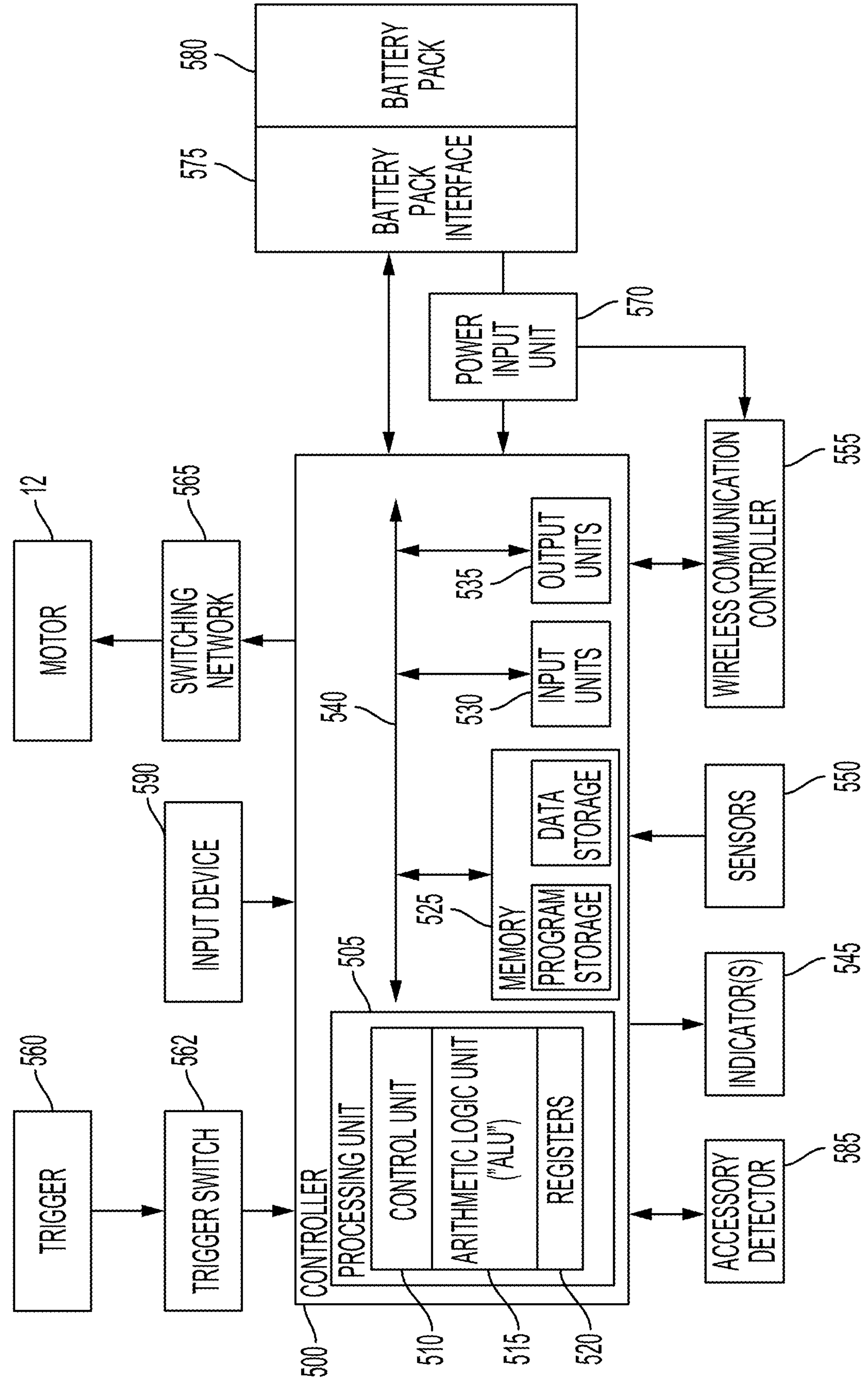
FIG. 5 is a block circuit diagram of the power tool of FIG. 1A.

The pressure in the piston cylinder 26 may be sensed by a pressure sensor 68 and the signals from the pressure sensor 68 are sent to the electronic control and monitoring circuitry (see, e.g., controller 500 of FIG. 5). The pressure sensor 68 may be referred to as a pressure transducer, a pressure transmitter, a pressure sender, a pressure indicator, a piezometer, or a manometer. The pressure sensor 68 is either an analog or digital pressure sensor. In some embodiments, the pressure sensor 68 is a force collector type of pressure sensor, such as piezoresistive strain gauge, capacitive, electromagnetic, piezoelectric, optical, and potentiometric. In some embodiments, the pressure sensor 68 is manufactured out of piezoelectric materials, such as quartz. In other embodiments, the pressure sensor 68 is a resonant, thermal, or ionization type of pressure sensor.

The speed of the motor 12 is sensed by a speed sensor that detects the position and movement of a rotor relative to stator and generates signals indicative of motor position, speed, and/or acceleration, which are provided to the electronic control and monitoring circuitry. In some embodiments, the speed sensor includes one or more Hall effect sensors to detect the position and movement of the rotor magnets.

The electric current flow through the motor 12 is sensed, for example, by a current sensor (e.g., an ammeter, a shunt resistor, etc.) and the output signals from the current sensor are sent to the electronic control and monitoring circuitry. Alternatively, the current flow through the motor 12 can be derived from voltage, using a voltage sensor (e.g., a voltmeter), taken across the resistance of the windings in the motor 12. Other methods can also be used to calculate the electric current flow through the motor 12 with other types of sensors. The hydraulic power tool can include other sensors to control and monitor other characteristics of the other movable components of the power tool 10, such as the motor 12, pump 14, or piston 30.

The position of the crimper head 72, such as the jaws 32 or the die, may be sensed by a position sensor 150, as illustrated in FIG. 1C. The position sensor 150 is, for example, a displacement sensor, a distance sensor, a photodiode array, a potentiometer, a proximity sensor, a Hall sensor, or the like. In some embodiments, the piston 30 includes a plurality of conductive rings (e.g., copper rings) situated around the piston 30. When the power tool 10 operates, the piston 30 and the conductive rings move within the piston cylinder 26. In some embodiments, the position sensor 150, which may be a Hall effect sensor situated within or near the piston cylinder 26, detects the distance by detecting the conductive rings moving with the piston 30. The further the piston 30 extends, the greater the number of conductive rings and distance detected by the position sensor 150. Based on the movement of the piston 30 during an operation of the power tool 10, the position sensor 150 generates an output signal representative of a distance that the piston 30 has traveled from a particular reference point, such as a proximal position or a home position. The output signal may be communicated to a controller 500 of the power tool 10, illustrated in FIG. 5.

In some embodiments, the position sensor 150 also provides information regarding the direction of motion of the piston 30. For example, the position sensor 150 determines whether the piston 30 is extending or retracting. In some embodiments, the position sensor 150 continuously senses the movement of the piston 30. In some embodiments, the position sensor 150 is only activated during a period of time the piston 30 is being driven.

While embodiments described herein primarily relate to crimping tools receiving dies and jaws, methods described herein may be implemented by other types of power tools. For example, it is contemplated that the methods of recognizing accessories described herein may be used with accessories for multiple types of power tools that rotate about an axis, such as drills, drivers, powered screw drivers, powered ratchets, grinders, right angle drills, rotary hammers, pipe threaders, or another type of power tool that experiences rotation about an axis. In some embodiments, the power tool 10 is a power tool that experiences translational movement along a longitudinal axis, such as reciprocal saws, chainsaws, pole-saws, circular saws, cut-off saws, die-grinder, and table saws. Accessories described herein may include drill bits, step drill bits, hole saws, grinder wheel, threading dies, saw blades, rivet tools, sanding sheets, hammer drill bits, and the like.

The controller 500 for the power tool 10 is illustrated in FIG. 5. The controller 500 is electrically and/or communicatively connected to a variety of modules or components of the power tool 10. For example, the illustrated controller 500 is connected to indicators 545, sensors 550 (which may include, for example, the pressure sensor 68, the speed sensor, the current sensor, the voltage sensor, the position sensor 150, etc.), a wireless communication controller 555, a trigger 560, a trigger switch 562, a switching network 565, a power input unit 570, an input device 590, and an accessory detector 585.

The controller 500 includes a plurality of electrical and electronic components that provide power, operational control, and protection to the components and modules within the controller 500 and/or power tool 10. For example, the controller 500 includes, among other things, a processing unit 505 (e.g., a microprocessor, an electronic processor, an electronic controller, a microcontroller, or another suitable programmable device), a memory 525, input units 530, and output units 535. The processing unit 505 includes, among other things, a control unit 510, an arithmetic logic unit ("ALU") 515, and a plurality of registers 520 (shown as a group of registers in FIG. 5), and is implemented using a known computer architecture (e.g., a modified Harvard architecture, a von Neumann architecture, etc.). The processing unit 505, the memory 525, the input units 530, and the output units 535, as well as the various modules connected to the controller 500 are connected by one or more control and/or data buses (e.g., common bus 540). The control and/or data buses are shown generally in FIG. 5 for illustrative purposes. The use of one or more control and/or data buses for the interconnection between and communication among the various modules and components would be known to a person skilled in the art in view of the embodiments described herein.

The memory 525 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 505 is connected to the memory 525 and executes software instruction that are capable of being stored in a RAM of the memory 525 (e.g., during execution), a ROM of the memory 525 (e.g., on a generally permanent basis), or another non-transitory computer readable medium such as another memory or a disc. Software included in the implementation of the power tool 10 can be stored in the memory 525 of the controller 500. The software includes, for example, firmware, one or more applications, program data, filters, rules, one or more program modules, and other executable instructions. The controller 500 is configured to retrieve from the memory 525 and execute, among other things, instructions related to the control processes and methods described herein. In other embodiments, the controller 500 includes additional, fewer, or different components.

In some embodiments, as described above, the power tool 10 is a crimper. The controller 500 drives the motor 12 to perform a crimp in response to a user's actuation of the trigger 560. Depression of the activation trigger 560 actuates a trigger switch 562, which outputs a signal to the controller 500 to initiate the crimp. The controller 500 controls the switching network 565 (e.g., a FET switching bridge) to drive the motor 12. When the trigger 560 is released, the trigger switch 562 no longer outputs the actuation signal (or outputs a released signal) to the controller 500. The controller 500 may cease a crimp action when the trigger 560 is released by controlling the switching network 565 to brake the motor 12. In some embodiments, the controller 500 performs a crimping action to completion in response to actuation of the trigger 560, regardless of whether the trigger 560 is released.

The battery pack interface 575 is connected to the controller 500 and is configured to receive a battery pack 580. The battery pack interface 575 includes a combination of mechanical (e.g., a battery pack receiving portion) and electrical components configured to and operable for interfacing (e.g., mechanically, electrically, and communicatively connecting) the power tool 10 with the battery pack 580. The battery pack interface 575 is coupled to the power input unit 570. The battery pack interface 575 transmits the power received from the battery pack 580 to the power input unit 570. The power input unit 570 includes active and/or passive components (e.g., voltage step-down controllers, voltage converters, rectifiers, filters, etc.) to regulate or control the power received through the battery pack interface 575 and to the wireless communication controller 555 and controller 500. When the battery pack 580 is not coupled to the power tool 10, the wireless communication controller 555 is configured to receive power from a back-up power source (e.g., a coin cell battery).

The indicators 545 are also coupled to the controller 500 and receive control signals from the controller 500 to turn on and off or otherwise convey information based on different states of the power tool 10. The indicators 545 include, for example, one or more light-emitting diodes (LEDs), or a display screen. The indicators 545 can be configured to display conditions of, or information associated with, the power tool 10. For example, the indicators 545 can display information relating to the success or failure of a crimping action performed by the power tool 10, display information relating to accessories received by the power tool 10, display information related to mismatch of accessories, and the like. In addition to or in place of visual indicators, the indicators 545 may also include a speaker or a tactile feedback mechanism to convey information to a user through audible or tactile outputs. The input device 590 may be an interface, such as one or more buttons, switches, or other mechanical input means that provide a means of input to the controller 500. In some instances, a user of the power tool 10 actuate the input device 590 to override a mismatch event, as described below in more detail.

In some embodiments, the memory 525 includes accessory data (e.g., die data, jaw data, etc.), which specifies, for example, one or more of the type of die (e.g., the size and material of the die) attached to the housing 11, the workpiece size, the workpiece shape, the workpiece material, the application type (e.g., electrical or plumbing), varieties of types of die compatible with the power tool 10, operations associated with received dies, etc. The memory 525 can also include expected curve data, which is described in more detail below. In some embodiments, the die data is communicated to and stored in the memory 525 via an external device 705 (see FIG. 7). In some embodiments, the die data is stored in a look-up table in the memory 525. The memory 525 may further store information relating to the manufacturer of the power tool 10.

Figure 6:
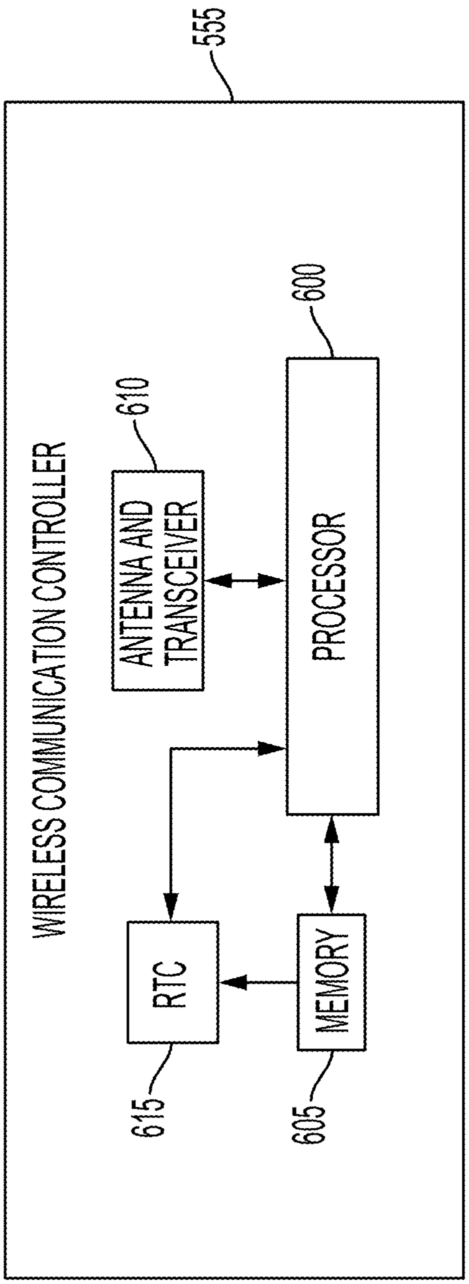
FIG. 6 is a block circuit diagrams of a wireless communication controller for the power tool of FIG. 1A.

As shown in FIG. 6, the wireless communication controller 555 includes a processor 600, a memory 605, an antenna and transceiver 610, and a real-time clock (RTC) 615. The wireless communication controller 555 enables the power tool 10 to communicate with an external device 705 (see, e.g., FIG. 7). The radio antenna and transceiver 610 operate together to send and receive wireless messages to and from the external device 705 and the processor 600. The memory 605 can store instructions to be implemented by the processor 600 and/or may store data related to communications between the power tool 10 and the external device 705 or the like. The processor 600 for the wireless communication controller 555 controls wireless communications between the power tool 10 and the external device 705. For example, the processor 600 associated with the wireless communication controller 555 buffers incoming and/or outgoing data, communicates with the controller 500, and determines the communication protocol and/or settings to use in wireless communications. The communication via the wireless communication controller 555 can be encrypted to protect the data exchanged between the power tool 10 and the external device 705 from third parties.

In the illustrated embodiment, the wireless communication controller 555 is a Bluetooth® controller. The Bluetooth® controller communicates with the external device 705 employing the Bluetooth® protocol. Therefore, in the illustrated embodiment, the external device 705 and the power tool 10 are within a communication range (i.e., in proximity) of each other while they exchange data. In other embodiments, the wireless communication controller 555 communicates using other protocols (e.g., Wi-Fi, ZigBee, a proprietary protocol, etc.) over different types of wireless networks. For example, the wireless communication controller 555 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 555 is configured to receive data from the controller 500 and relay the information to the external device 705 via the antenna and transceiver 610. In a similar manner, the wireless communication controller 555 is configured to receive information (e.g., configuration and programming information) from the external device 705 via the antenna and transceiver 610 and relay the information to the controller 500.

The RTC 615 increments and keeps time independently of the other power tool components. The RTC 615 receives power from the battery pack 580 when the battery pack 580 is connected to the power tool 10 and receives power from the back-up power source when the battery pack 580 is not connected to the power tool 10. Having the RTC 615 as an independently powered clock enables time stamping of operational data (stored in memory 605 for later export) and a security feature whereby a lockout time is set by a user (e.g., via the external device 705) and the tool is locked-out when the time of the RTC 615 exceeds the set lockout time.

Figure 7:
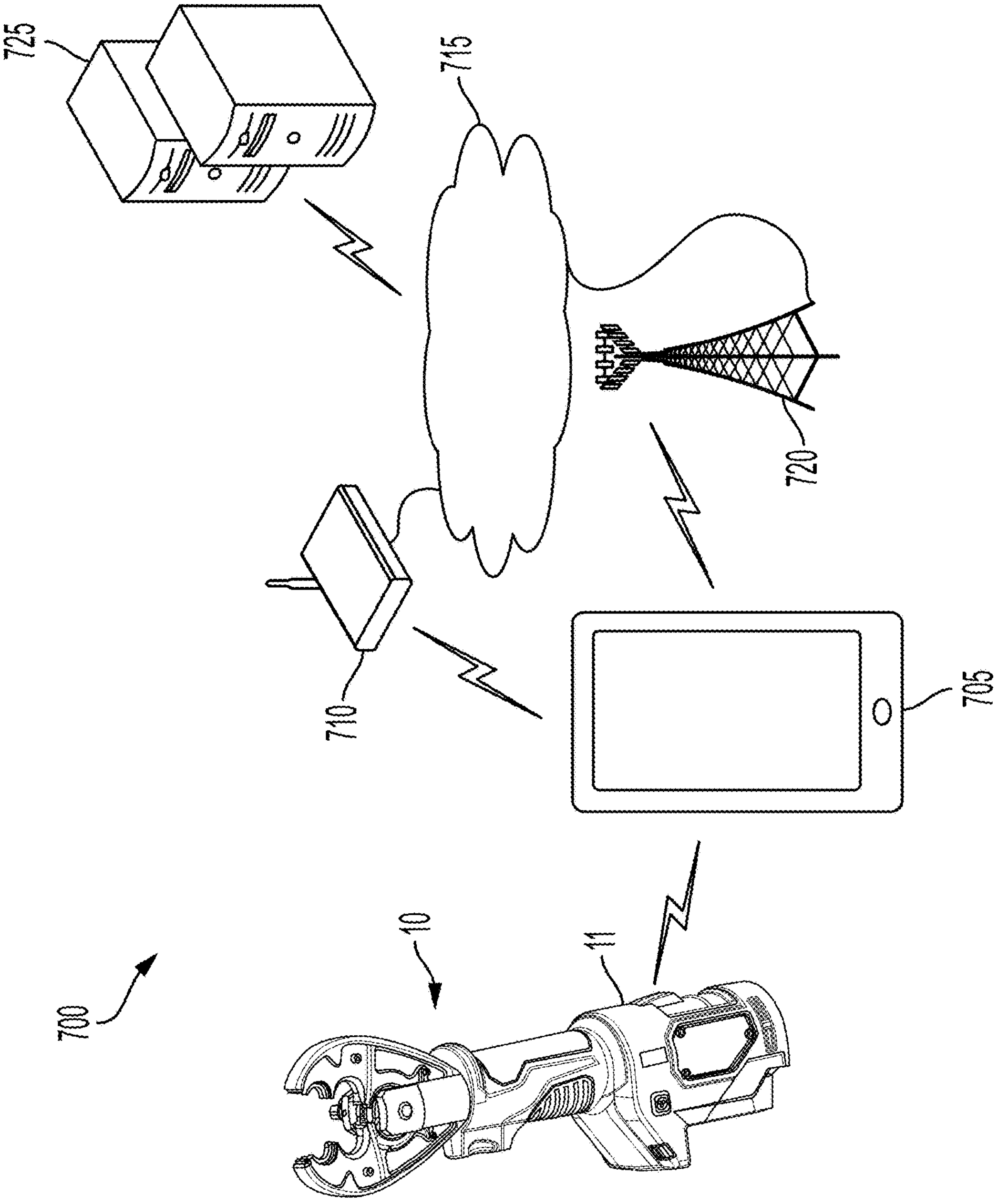
FIG. 7 is a communication system for the power tool of FIG. 1A including an external device in accordance with an embodiment described herein.

FIG. 7 illustrates a communication system 700. The communication system 700 includes at least one power tool 10 (illustrated as the crimper) and an external device 705. Each power tool 10 and the external device 705 can communicate wirelessly while they are within a communication range of each other. Each power tool 10 may communicate power tool status, power tool operation statistics, power tool identification, power tool sensor data, stored power tool usage information, power tool maintenance data, accessory data, and the like.

More specifically, the power tool 10 can monitor, log, and/or communicate various tool parameters that can be used for confirmation of correct tool performance, detection of a malfunctioning tool, and determination of a need or desire for service. Taking, for example, the crimper as the power tool 10, the various tool parameters detected, determined, and/or captured by the controller 500 and output to the external device 705 can include a crimping time (e.g., time it takes for the power tool 10 to perform a crimping action), a type of die received by the power tool 10, a type of jaws received by the power tool 10, a die and/or jaw mismatch, a time (e.g., a number of seconds) that the power tool 10 is on, a number of overloads (i.e., a number of times the tool 10 exceeded the pressure rating for the die, the jaws 32, and/or the tool 10), a total number of cycles performed by the tool, a number of cycles performed by the tool since a reset and/or since a last data export, a number of full pressure cycles (e.g., number of acceptable crimps performed by the tool 10), a number of remaining service cycles (i.e., a number of cycles before the tool 10 should be serviced, recalibrated, repaired, or replaced), a number of transmissions sent to the external device 705, a number of transmissions received from the external device 705, a number of errors generated in the transmissions sent to the external device 705, a number of errors generated in the transmissions received from the external device 705, a code violation resulting in a master control unit (MCU) reset, a short in the power circuitry (e.g., a metal-oxide-semiconductor field-effect transistor (MOSFET) short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a motor stall condition (i.e., a locked or non-moving rotor with an electrical current flowing through the windings), a bad Hall sensor, a non-maskable interrupt (NMI) hardware MCU Reset (e.g., of the controller 500), an over-discharge condition of the battery pack, an overcurrent condition of the battery pack, a battery dead condition at trigger pull, a tool FETing condition, gate drive refresh enabled indication, thermal and stall overload condition, a malfunctioning pressure sensor condition for the pressure sensor 68, trigger pulled at tool sleep condition, Hall sensor error occurrence condition for one of the Hall sensors, heat sink temperature histogram data, MOSFET junction temperature histogram data, peak current histogram data (from the current sensor), average current histogram data (from the current sensor), the number of Hall errors indication, etc.

The external device 705 is, for example, a smart phone (as illustrated), a laptop computer, a tablet computer, a personal digital assistant (PDA), or another electronic device capable of communicating wirelessly with the power tool 10 and providing a user interface. The external device 705 provides the user interface and allows a user to access and interact with the power tool 10. The external device 705 can receive user inputs to determine operational parameters, enable or disable features, and the like. The user interface of the external device 705 provides an easy-to-use interface for the user to control and customize operation of the power tool 10. The external device 705, therefore, grants the user access to the tool operational data of the power tool 10, and provides a user interface such that the user can interact with the controller 500 of the power tool 10.

Using the external device 705, a user can access the tool parameters obtained by the power tool 10. With the tool parameters (e.g., tool operational data), a user can determine how the power tool 10 has been used (e.g., number of crimps performed), whether maintenance is recommended or has been performed in the past, determine mismatch events performed by the power tool 10, determine how often accessories are used, and identify malfunctioning components or other reasons for certain performance issues. The external device 705 can also transmit data to the power tool 10 for power tool configuration, firmware updates, or to send commands. The external device 705 also allows a user to set operational parameters, safety parameters, select usable dies, select tool modes, and the like for the power tool 10.

In addition, as shown in FIG. 7, the external device 705 can also share the tool operational data obtained from the power tool 10 with a remote server 725 connected through a network 715. The remote server 725 may be used to store the tool operational data obtained from the external device 705, provide additional functionality and services to the user, or a combination thereof. In some embodiments, storing the information on the remote server 725 allows a user to access the information from a plurality of different locations. In some embodiments, the remote server 725 collects information from various users regarding their power tools and provide statistics or statistical measures to the user based on information obtained from the different power tools. For example, the remote server 725 may provide statistics regarding the experienced efficiency of the power tool 10, typical usage of the power tool 10, accessory information, geolocation statistics of the power tool 10, and other relevant characteristics and/or measures of the power tool 10. The network 715 may include various networking elements (routers 710, hubs, switches, cellular towers 720, wired connections, wireless connections, etc.) for connecting to, for example, the Internet, a cellular data network, a local network, or a combination thereof as previously described. In some embodiments, the power tool 10 is configured to communicate directly with the server 725 through an additional wireless interface or with the same wireless interface that the power tool 10 uses to communicate with the external device 705.

Returning to FIGS. 3 and 4, when a crimping operation is initiated (e.g., by pressing a motor activation trigger 560 of the power tool 10), the input shaft 50 is driven by the motor 12 in a counter-clockwise direction, thereby rotating the valve actuator 46 counter-clockwise. In some embodiments, the electric current flow through the motor 12 initially increases with inrush current and then drops to a steady state current flow. As the valve actuator 46 rotates counter-clockwise, rotational or centrifugal forces cause the second set of pawls 56 to extend from the body 48 and the first set of pawls 52 to retract into the body 48. As the input shaft 50 continues to rotate, one of the pawls 56 engages the second radial projection 64, rotating the return valve 34 clockwise from the open position to a closed position in which the return port 38 is misaligned with the return passageway 42. While examples provided herein primarily refer to power tools having a valve actuator 46 that causes movement of the first set of pawls 52 and the second set of pawls 56, methods described herein may also be implemented using other types of power tools that do not include such components (e.g., does not include, among other things, the return valve 34 and/or valve actuator 46).

Each type of die (e.g., size and shape) for a particular power tool 10 along with the type of workpiece material (e.g., malleable metal) can have different piston cylinder pressure, motor speed, motor current, and other characteristics over the time the crimp is being performed (e.g., the crimper head 72 is closing and opening). These characteristics (e.g., piston cylinder pressure, motor speed, ram distance, or motor current) are used to monitor, analyze, and evaluate the activity of the power tool 10. For instance, monitored characteristics are compared with the expected characteristics of good crimps for a particular die and material to determine whether the crimp is acceptable and whether power tool 10 is operating properly. Additionally, operation of the motor 12 may be adjusted based on the type of the die received by the power tool 10 to increase the success rate of crimping operations. For example, a maximum motor current, a minimum motor current, a maximum motor voltage, a minimum motor voltage, a maximum motor speed, a minimum motor speed, and the like may be selected based on the type of the die received by the power tool 10.

In some embodiments, the die received by the power tool 10 includes a wireless identifier, such as a radio frequency identification (RFID) or near-field communication (NFC) tag, that corresponds to the particular type of die. In other embodiments, the die received by the power tool 10 may include a physical, wired, or other type of identifier, such as a unique resistive pattern engraved on the die, an arrangement of pins or magnets that create a unique magnetic field, one or more magnets configured to generate a magnetic field, a printed pattern (such as a bar code or QR code), or some other measurable physical characteristics. The controller 500 of the power tool 10 may receive the wireless identifier or detect the physical identifier (e.g., using one or more sensors) and use the identified or detected type of die when determining a successful or unsuccessful operation (e.g., a crimp). Additionally, the controller 500 may select a mode of operation based on the type of die or select operating parameters for driving the motor 12 based on the type of die.

The power tool 10 includes an accessory detector 585 for detecting connection of an accessory (e.g., an insertion of a die or jaws into the power tool 10). Additionally, the accessory detector 585 may indicate or provide the type of the accessory. For example, the accessory detector 585 may determine an identification number associated with a die and provide the identification number to the controller 500. In other embodiments, the controller 500 determines the identification number associated with the die based on signals received from the accessory detector 585. For example, the accessory detector 585 may include an RFID reader configured to detect an RFID tag included in or on the accessory (e.g., a die). The accessory detector 585 may include an NFC reader configured to detect an NFC tag included in or on the accessory (e.g., a die). In some embodiments, the accessory detector 585 includes an imaging device configured to capture an image of the accessory as the accessory is received within, for example, the crimper head 72 or the cylinder housing 22. The controller 500 may detect, based on the image, measurable physical characteristics of the accessory to identify the type of the accessory. In some embodiments, the accessory detector 585 includes a magnetic sensor (e.g., a Hall effect sensor) configured to detect a magnetic field associated with the accessory. The accessory detector 585 may also include a resistive circuit configured to electrically connect to the accessory and measure a resistance of the die for identification purposes.

Figure 8:
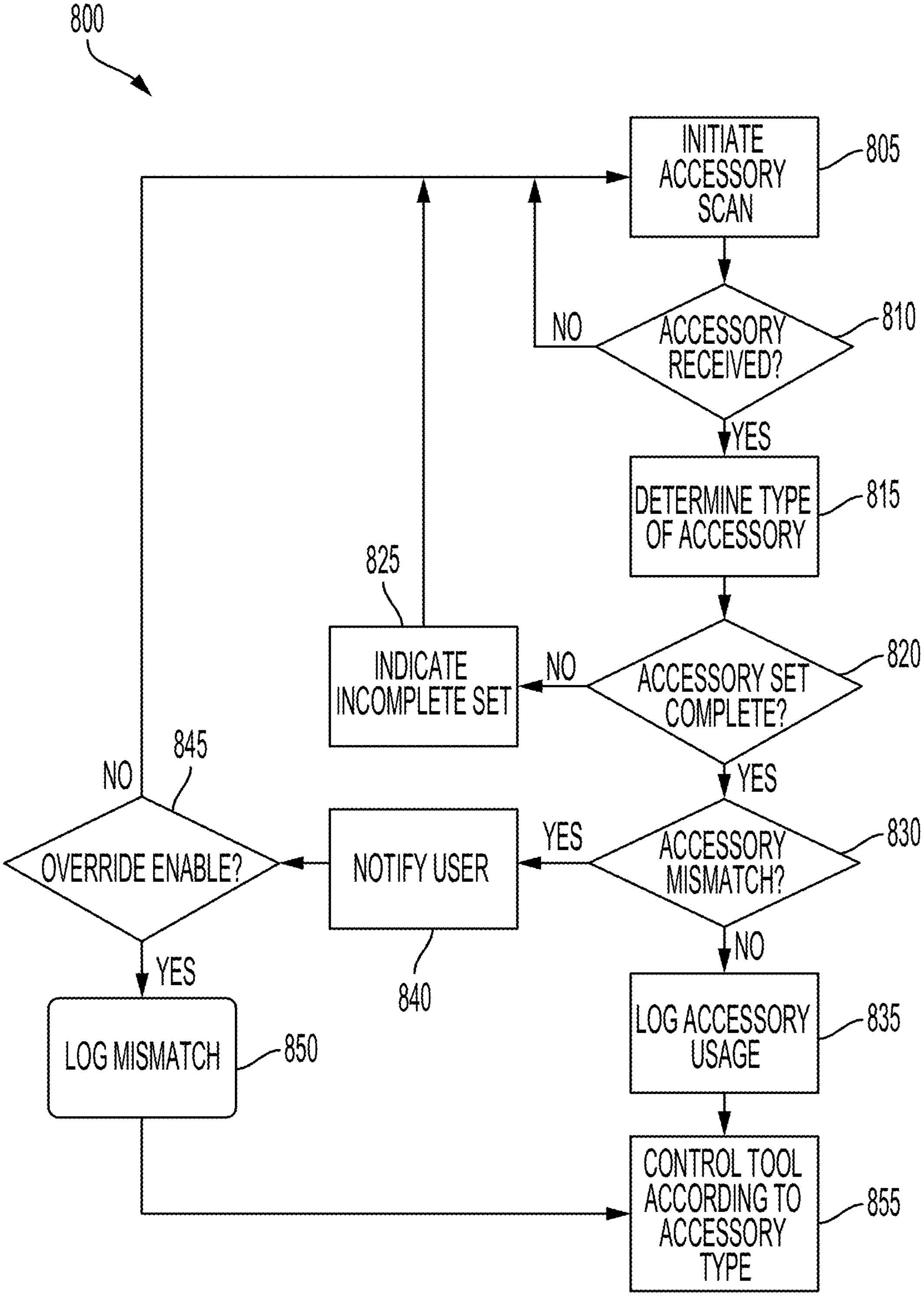
FIG. 8 illustrates a block diagram of a method performed by the controller of FIG. 5 in accordance with an embodiment described herein.

FIG. 8 illustrates a method 800 performed by the controller 500 for identifying an accessory received by the power tool 10. The steps of the method 800 are shown for illustrative purposes. The controller 500 can perform one or more of the steps in an order different than that shown in FIG. 8, or one or more steps of the method 800 can be removed from the method 800. Additionally, although the method 800 is primarily described with respect to the accessory being a die, the method 800 is applicable to other accessories disclosed herein.

At step 805, the controller 500 initiates an accessory scan operation. For example, the accessory detector 585 detects a die being inserted into the crimper head 72 or the cylinder housing 22. When a die is received by the crimper head 72 or the cylinder housing 22, the accessory detector 585 provides a signal to the controller 500 indicative of the die being received. In some embodiments, the accessory detector 585 measures the identifier of the die and transmits a signal indicative of the identifier to the controller 500 (e.g., transmits the identification number associated with the die).

At step 810, the controller 500 determines whether an accessory is received by the power tool 10. For example, the controller 500 may determine whether a die is received by the crimper head 72 or the cylinder housing 22 based on whether a signal is received from the accessory detector 585.

When an accessory is not received ("NO" at step 810), the controller 500 returns to step 805 and continues to initiate accessory scan operations to monitor for an accessory to be attached to the power tool 10. When an accessory is received ("YES" at step 810), the controller 500 proceeds to step 815 and determines a type of the accessory. For example, the controller 500 may compare the identification number associated with the die (detected by the accessory detector 585) to a table stored in the memory 525.

Figure 9A:
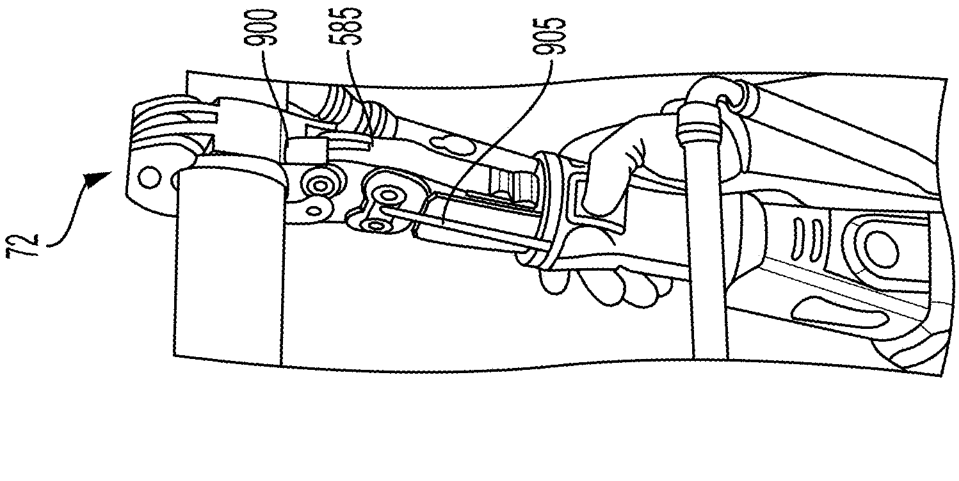
FIGS. 9A, 9B, and 9C are example accessory identifiers in the power tool of FIG. 1A in accordance with embodiments described herein.
Figure 9B:
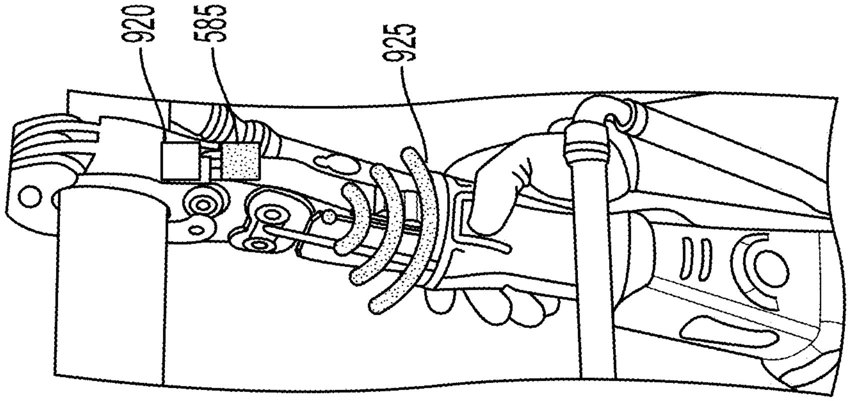
Figure 9C:
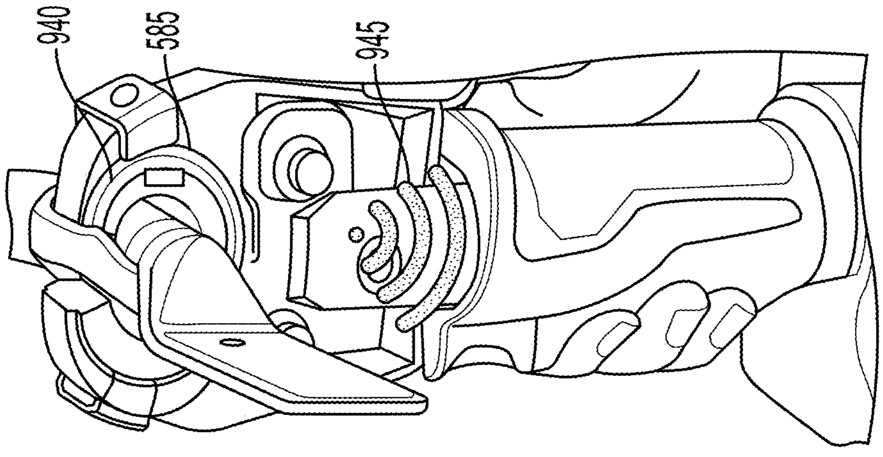

FIGS. 9A-9C provides examples of the accessory detector 585 detecting an identifier within an accessory. In the examples of FIGS. 9A-9C, the accessory detector 585 is embedded within the crimper head 72. In FIG. 9A, a press ring received by the crimper head 72 includes a resistive element 900, such as a resistor. The accessory detector 585 detects the resistance value of the resistive element 900 and transmits the resistance value to the controller 500 via an electrical connection 905. The controller 500 determines the type of the accessory based on the value of the resistance. In FIG. 9B, a press ring received by the crimper head 72 includes indicia 920 (e.g., machine readable indicia), such as a bar code or a QR code. The accessory detector 585 reads indicia 920 on the press ring and transmits a signal including information provided by the indicia 920 to the controller 500 via a wireless connection 925. The controller 500 determines the type of the accessory based on the indicia information. In FIG. 9C, a press ring received by the crimper head 72 includes a resistive element 940. The accessory detector 585 detects the resistance value of the resistive element 940 and transmits the resistance value to the controller 500 via a wireless connection 945. The controller 500 determines the type of the accessory based on the resistance value. The examples provided in FIG. 9A-9C are merely illustrative of techniques for determining an accessory type, and other techniques can be implemented within the spirit and scope of the embodiments described herein.

Returning to FIG. 8, at step 820 the controller 500 determines whether a complete accessory set is received by the power tool 10. For example, the crimper head 72 may be configured to receive a pair of dies. An upper die and a lower die combined to form the pair of dies, and each die has a respective identifier. When the controller 500 has received signals from the accessory detector 585 indicating that both dies are received, the controller 500 determines the accessory set is complete ("YES" at step 820) and proceeds to step 830. When the controller 500 has received a signal from only a single die of the pair of dies, the controller 500 determines the accessory set is incomplete ("NO" at step 820), and proceeds to step 825. At step 825, the controller 500 provides an indication that the set is incomplete via the indicators 545 and/or an interface of the external device 705.

At step 830, the controller 500 determines whether received accessories are mismatched. For example, to perform a crimping operation, the upper die and the lower die forming the pair of dies should be the same type of die (e.g., have the same size, be composed of the same material, have a same crimping pattern, be otherwise compatible with one another, etc.). In some embodiments, the controller 500 compares the identification number of the upper die with the identification number of the lower die to determine whether the upper die and the lower die are of the same type. When the upper die and the lower die are not of the same type, the controller 500 determines the received accessories are mismatched ("YES" at step 830) and proceeds to step 840. At step 840, the controller 500 provides a notification indicative of the mismatch via the indicators 545 and/or on an interface of the external device 705. In some embodiments, when the accessories are mismatched, the controller 500 locks operation of the power tool 10.

At step 845, the controller 500 determines whether an override is enabled. For example, a user of the power tool 10 may override the die mismatch by providing an input to the power tool 10. The input may be an input device integrated within the housing 11 of the power tool 10 or provided by the external device 705. When the override is not enabled ("NO" at step 845), the controller 500 returns to step 805, providing the user an opportunity to change at least one of the accessories. When the override is enabled ("YES" at step 845), the controller 500 proceeds to step 850 and logs the mismatched accessories. For example, the memory 525 stores a historical log (e.g., an accessory log) including, among other things, accessories received by the power tool 10 and operations performed by the power tool 10 using the accessories. The controller 500 updates the historical log to include the die mismatch. When the override is enabled, the controller 500 may unlock operation of the power tool 10.

Returning to step 830, when the received accessories are not mismatched ("NO" at step 830), the controller 500 proceeds to step 835 and logs the accessory usage. For example, the controller 500 updates the historical log stored in the memory 525 to include the accessories received by the power tool 10.

At step 855, the controller 500 controls the power tool 10 according to the accessory type. For example, the controller 500 may select a set of control parameters based on the type of the accessory. The control parameters may include, for example, a maximum motor current, a minimum motor current, a maximum motor voltage, a minimum motor voltage, a maximum motor speed, a minimum motor speed, and the like, for driving the motor 12. In some embodiments, the set of control parameters includes one or more functions for the controller 500 to implement. For example, set of control parameters may include a period of time at which to drive the motor 12 for the selected die.

Figure 10:
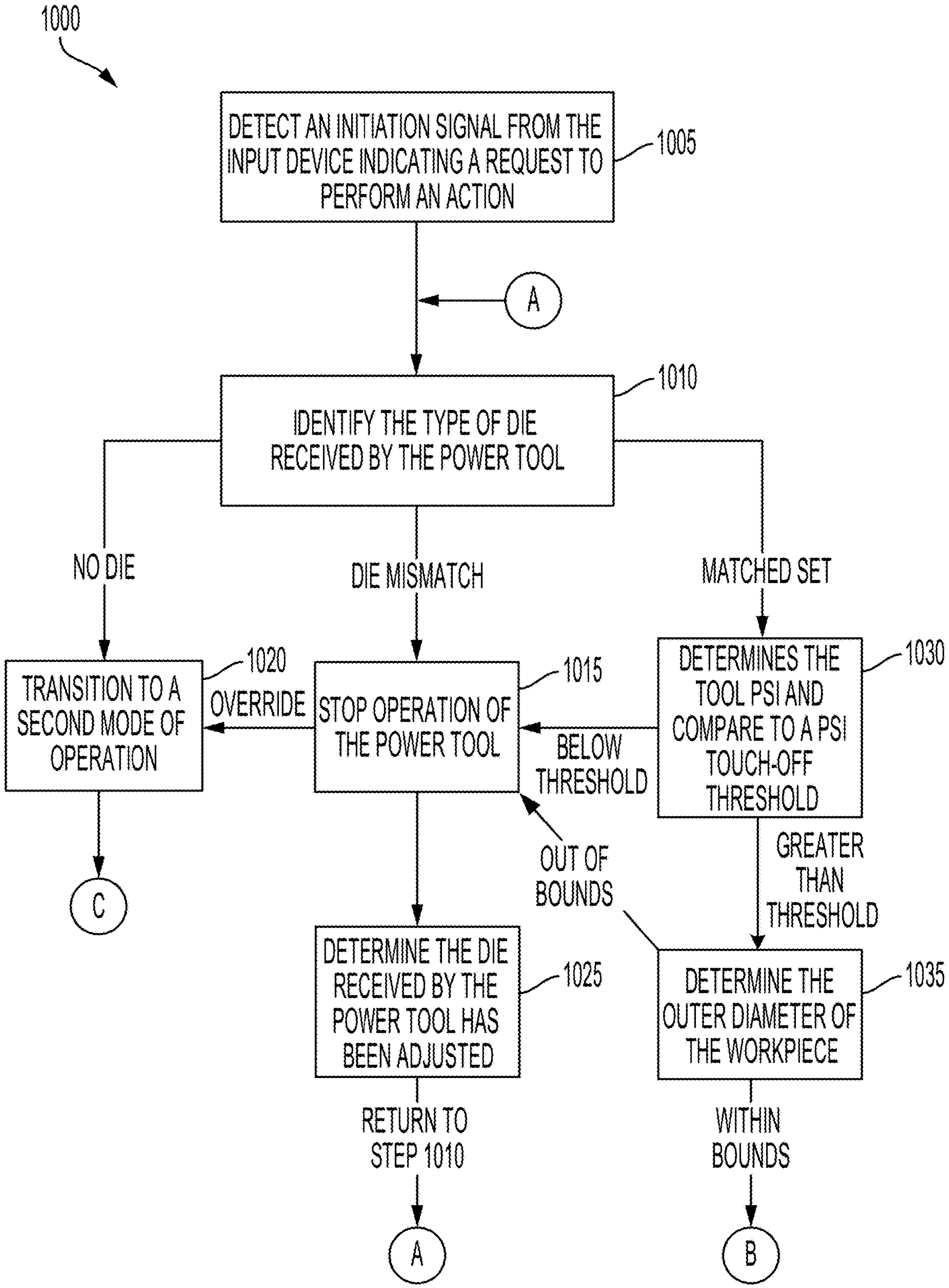
FIG. 10 illustrates a block diagram of a method performed by the controller of FIG. 5 in accordance with embodiments described herein.

FIG. 10 illustrates a method 1000 performed by the controller 500 for determining a mode of operation based on the type of die (or lack of die) installed in the power tool 10. The steps of the method 1000 are shown for illustrative purposes. The controller 500 can perform one or more of the steps in an order different than that shown in FIG. 10, or one or more steps of the method 1000 can be removed from the method 1000.

At step 1005, the controller 500 detects an initiation signal (e.g., a first signal) from an input device, such as the trigger 560, indicating a request to perform an action. In some embodiments, the action is a crimping action performed on an object (e.g., a connector). For example, depression of the trigger 560 actuates a trigger switch 562, which outputs a signal to the controller 500 to actuate the crimp. In some embodiments, the initiation signal is transmitted to the controller 500 by the external device 705.

At step 1010, the controller 500 identifies a type of die received by the power tool 10, as previously described with respect to method 800. The type of die may indicate, for example, the die size and the die material. In some embodiments, the controller 500 receives a second signal from the wireless identifier of the die indicating the type of die. In some embodiments, the type of die is determined based on a color of the die, a pattern engraved into the die, or the like. In some embodiments, the die includes a magnet detected by a detector in the power tool 10, and the controller 500 determines the type of the die based on the magnetic flux detected by the accessory detector 585.

In some embodiments, the type of die is identified by comparing the second signal to a look-up table. For example, the memory 525 or server 725 may store all die types compatible with the power tool 10. When the power tool 10 receives the die, such as a 250 MCM die, the die is compared to the table to determine whether the die is compatible with the power tool 10. Where the die type does not align with die information stored in the look-up table, a die mismatch occurs, and the controller 500 continues to step 1015. In some embodiments, the second signal includes die manufacturer information. Should the die manufacturer information not align with the manufacturer information stored in the memory 525 or server 725, a die mismatch occurs, and the controller 500 continues to step 1015. A die mismatch may also occur where an upper die and a lower die do not match, as previously described. For example, the power tool 10 receives a 250 MCM upper die and a 300 MCM lower die. The controller 500 determines the upper die and the lower die are not compatible and continues to step 1015.

At step 1015, the controller 500 stops operation of the power tool 10. For example, where the initiation signal was a request to perform a crimping action, the crimping action is halted. In some embodiments, at step 1025, the controller 500 determines the die received by the power tool 10 has been adjusted. For example, a user of the power tool 10 may adjust the die received by the power tool 10. Adjusting the die may strengthen the signal of the wireless identifier, allowing the controller 500 to more accurately determine the type of die. After the die has been adjusted, the controller 500 returns to step 1010. In some embodiments, the controller 500 receives a signal indicating an override of the die mismatch. For example, a user of the power tool 10 may provide the override via an input device 590, the external device 705, or the like. Upon receiving the override, the controller 500 continues to step 1020 and transitions to a second mode of operation, such as a PSI-only mode of operation.

Returning to step 1010, in some embodiments, the controller 500 determines no die is received by the power tool 10. When no die is received by the power tool 10, the controller 500 proceeds to step 1015 and transitions to the second mode or method of operation for a dieless power tool shown in and described with respect to FIG. 13 (described below).

In some embodiments, the controller 500 determines the type of die received by the power tool 10 aligns with the die information stored in the look-up table. When the type of die matches, the controller 500 proceeds to step 1030. At step 1030, the controller 500, using the pressure sensor 68, determines the tool PSI and compares the tool PSI to a PSI touch-off threshold. The PSI touch-off threshold may be a minimum PSI needed for operation of the power tool 10. In some embodiments, the tool PSI is below the PSI touch-off threshold, and the controller 500 continues to step 1015, where operation is halted. In some embodiments, when the tool PSI is below the PSI touch-off threshold, the controller 500 outputs an error indication with the indicators 545 and/or external device 705.

In some embodiments, the tool PSI is greater than or equal to the PSI touch-off threshold, and the controller 500 continues to step 1035. At step 1035, the controller 500 determines the outer diameter of the workpiece, such as a connector, and determines whether the workpiece is compatible with the die received by the power tool 10. The outer diameter of the workpiece may be determined by detecting the position of the jaws 32. In some embodiments, the workpiece includes an identification tag, such as an RFID tag, indicating the size and material of the workpiece. The controller 500 analyzes the identification tag to determine at least the outer diameter of the workpiece. The controller 500 compares the outer diameter of the workpiece to outer diameters stored within the memory 525 or server 725. Where the workpiece and the die are determined to be incompatible, the controller 500 returns to step 1015. Where the workpiece and the die are determined to be compatible, the controller 500 continues to step 1105, shown in FIG. 11.

Figure 11:
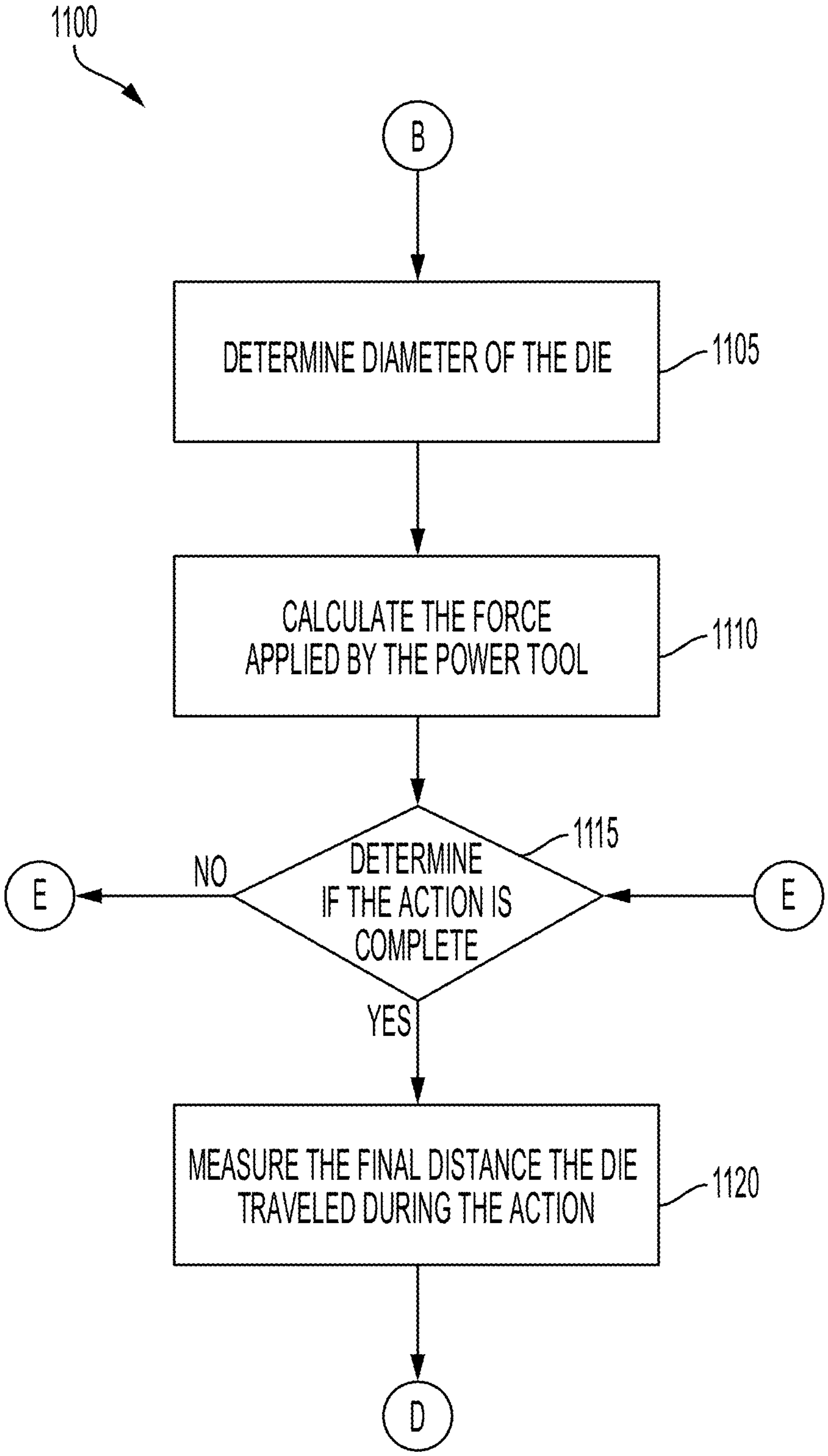
FIG. 11 illustrates a block diagram of a method performed by the controller of FIG. 5 in accordance with embodiments described herein.

FIG. 11 illustrates a method 1100 performed by the controller 500 while the power tool 10 performs the requested action. At step 1105, the controller 500 determines the diameter of the die. The diameter of the die may be determined, for example, based on the wireless identifier, such as the RFID or NFC tag included with the die, a unique resistive pattern engraved on the die, a strength of a magnetic field from a magnet included in the die, or the like, as described herein. Where the diameter of the die is within a predetermined range (e.g., greater than a die diameter threshold), the controller 500 continues to step 1110. Where the diameter of the die is not within the predetermined range, the controller 500 can return to step 1015 of FIG. 10.

At step 1110, the controller 500 calculates the force applied by the power tool 10 to the workpiece. For example, the controller 500 may use the pressure as indicated by the pressure sensor 68 to determine the change in pressure as the action is performed by the power tool 10. In some embodiments, the force applied by the power tool 10 is stored in the memory 525.

At step 1115, the controller 500 determines whether the action is complete. For example, the controller 500 receives a signal from the pressure sensor 68, and determines the action is complete based on the pressure being above a pressure threshold. In some embodiments, the controller 500 determines the action is complete based on the diameter of the die and the distance the die travelled during the action. At step 1120, after the action is complete, the controller 500 determines the final distance the die traveled during the action. For example, the controller 500 may use the output signal of the position sensor 150 to determine the final distance of the die. In some embodiments, the controller 500 continues to step 1205 of FIG. 12. In response to determining that the action is not complete, the controller 500 may return to step 1105.

In some embodiments, the controller 500 determines or calculates the integral of the force (e.g., the force over distance) applied by the power tool 10 to the workpiece. For example, as the crimping action is performed, the controller 500 calculates the force applied (e.g., the pressure applied) by the power tool 10, as described above. If, at step 1115, the action is not complete, the calculated force is stored in the memory 525. In some embodiments, the controller 500 determines the distance traveled by the die when the force is calculated. Each calculated force is associated with the determined distance to create a pressure curve indicative of the action performed by the power tool 10.

Figure 12:
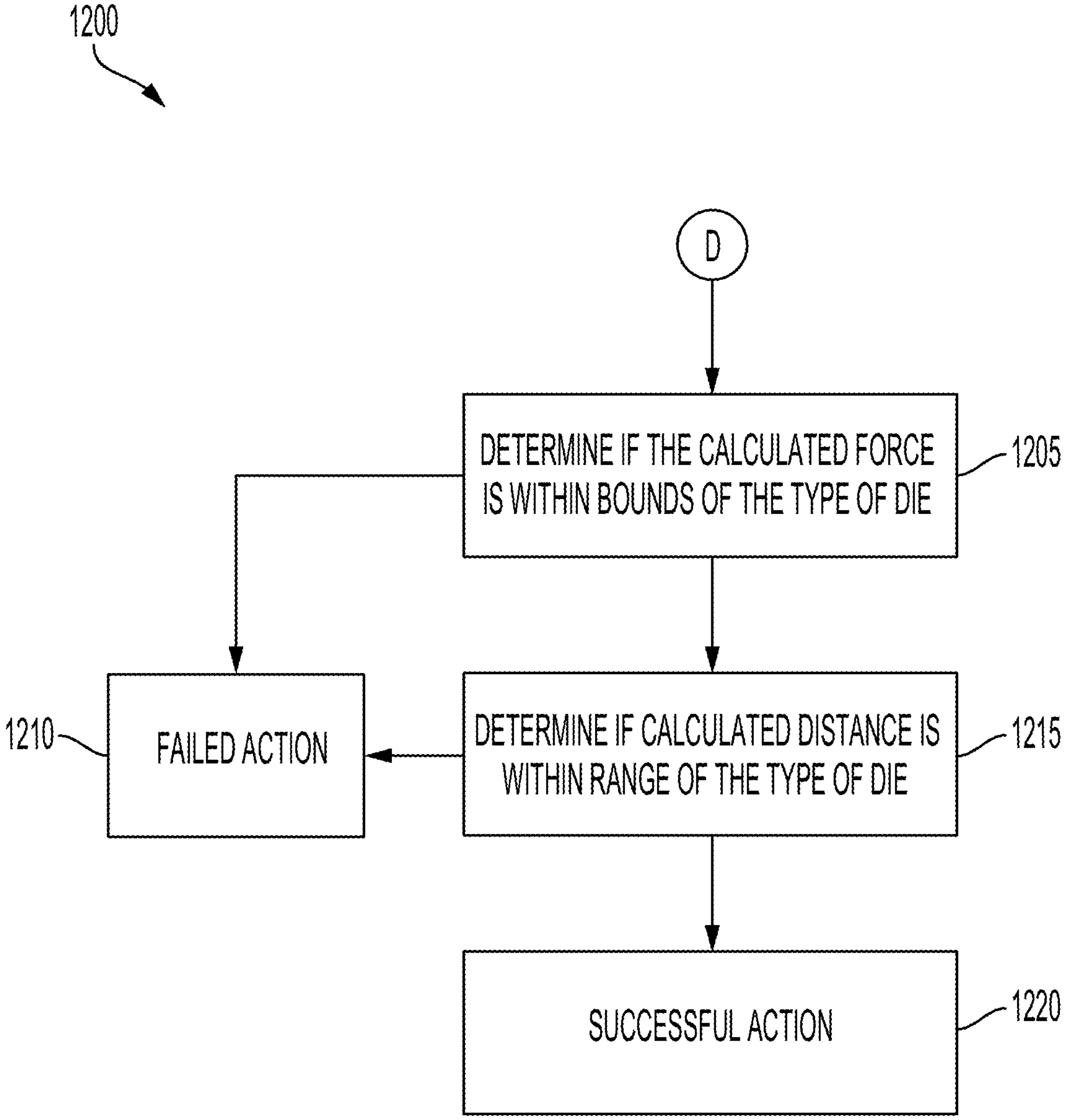
FIG. 12 illustrates a block diagram of a method performed by the controller of FIG. 5 in accordance with embodiments described herein.

FIG. 12 illustrates a method 1200 performed by the controller 500 to determine a status of the action performed by the power tool 10, such as a successful crimp or an unsuccessful crimp, based on the work performed during the action (e.g., a combination of force and distance). At step 1205, the controller 500 determines whether the calculated force is within bounds of the type of die. For example, the calculated force is compared to a force value associated with the type of die and stored within the look-up table. The controller 500 then determines whether the calculated force is within a force threshold.

When the calculated force is not within the bounds of the type of die, and the controller 500 determines the action performed by the power tool 10 was a failure, as shown at step 1210. For example, the controller 500 determines the crimping action was unsuccessful. The controller 500 may indicate the failure with the indicators 545 and/or the external device 705 using, for example, a red LED of the indicators 545 to indicate the failure.

When the calculated force is within the bounds of the type of die, and the controller 500 continues to step 1215. At step 1215, the controller 500 determines whether the calculated distance is within bounds of the type of die. For example, the calculated distance is compared to a distance value associated with type of die and stored within the look-up table. The controller 500 then determines whether the calculated distance is within a distance threshold.

When the calculated distance is not within the bounds of the type of die, and the controller 500 continues to step 1210, as described above. When the calculated distance is within the bounds of the type of die, and the controller 500 continues to step 1220. At step 1220, the controller 500 determines the action performed by the power tool 10 was a success. For example, the controller 500 determines the crimping action was a success. The controller 500 may indicate the success with the indicators 545 and/or the external device 705 using, for example, a green LED of the indicators 545 to indicate the success.

Figure 13:
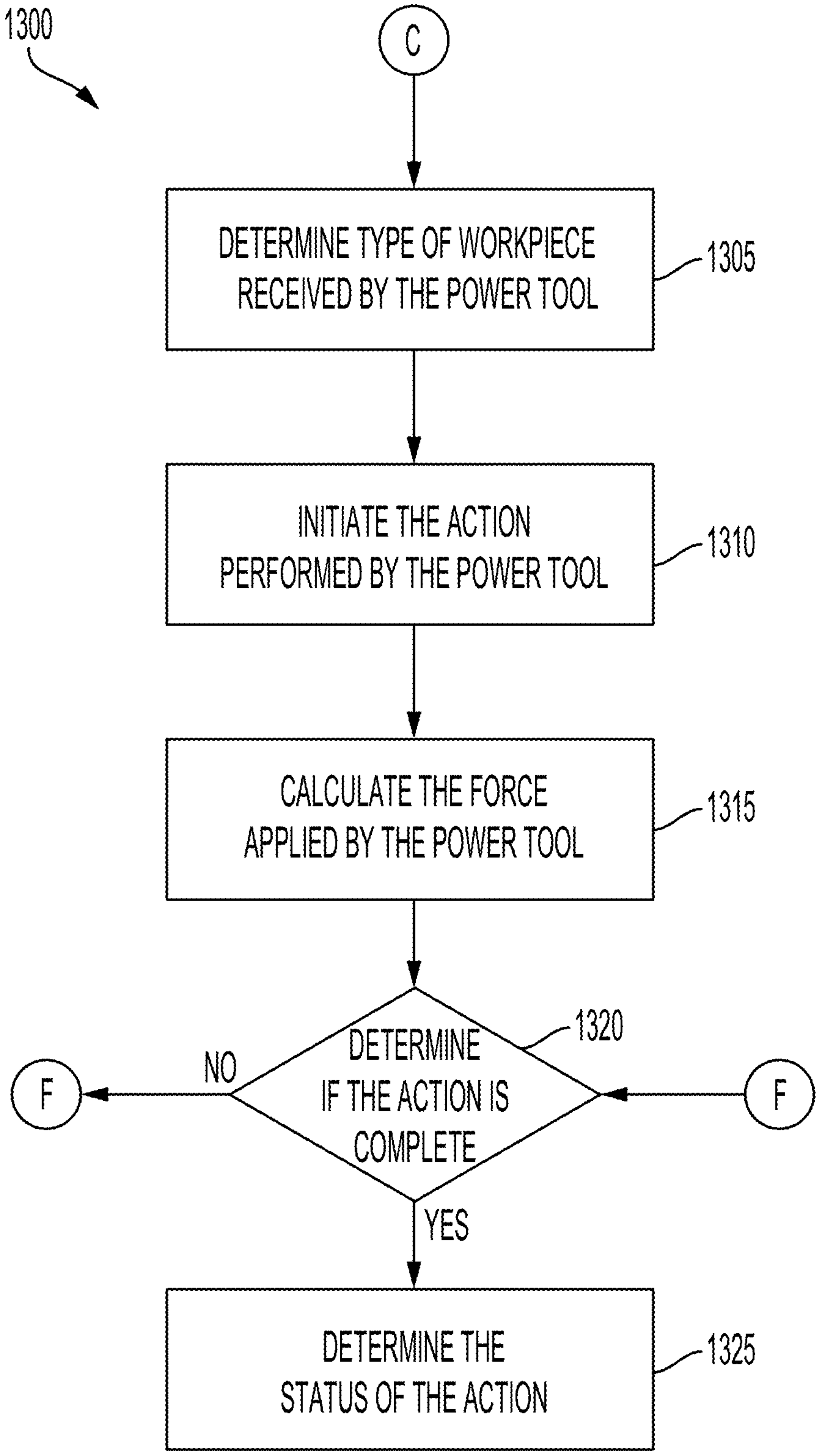
FIG. 13 illustrates a block diagram of a method performed by the controller of FIG. 5 in accordance with embodiments described herein.

FIG. 13 illustrates a method 1300 performed by the controller 500 when the power tool 10 is, for example, a dieless crimper (e.g., based on the determination from method 1000 at step 1020). For example, at step 1305, the controller 500 determines the type of the workpiece received by the power tool 10, as described above. At step 1310, the controller 500 initiates the action performed by the power tool 10, such as a crimping action performed by a dieless crimp. At step 1315, the controller 500 calculates the force or pressure applied by the power tool 10 (e.g., hydraulic work), as described above. At step 1320, the controller 500 determines whether the action is complete, as described above. At step 1325, the controller 500 determines the status of the action based on the calculated force or pressure.

In some embodiments, the controller 500 stores the status of the action (e.g., the success or the failure) in the memory 525 of the power tool 10 or a memory of the remote server 725. The stored statuses can be used for determining future statuses of actions. For example, the controller 500 may store previous pressure values and previous distance values indicative of a successful crimp. The controller 500 compares the determined pressure of the power tool 10 and the determined distance of the die to previous pressure values and distance values. Where the values are the same, the controller 500 may determine the status of the action as a success. Where the values are not the same, the controller 500 compares the determined pressure of the power tool 10 and the determined distance of the die to the look-up table, as described above.

In some embodiments, the controller 500 uses machine learning or an artificial intelligence model to determine the status of the action. For example, a machine learning model may be made available to the power tool 10 in the memory 525, the external device 705, the server 725, or the like. The model is provided with a series of pressure curves relating to how the pressure detected by pressure sensor 68 changes over the distance the die travels for a given die and workpiece combination. Once the model is trained or updated with these pressure curves, the pressure curves can be used to determine the status of the action with greater accuracy. For example, a detected pressure curve formed as the action is performed may be compared to previous pressure curves used to train the model. In some embodiments, the pressure curves stored by the memory 525 as the power tool 10 is used may be provided to the model as additional training. The updated pressure curves are stored in the memory 525, the external device 705, and/or the server 725 in order to be accessed and used to determine the status of a future action (e.g., crimp) by the power tool 10. In some embodiments, machine learning model is also used to identify and generate new pressure curves for new dies, or can learn or identify differences between material grades.

Figure 14:
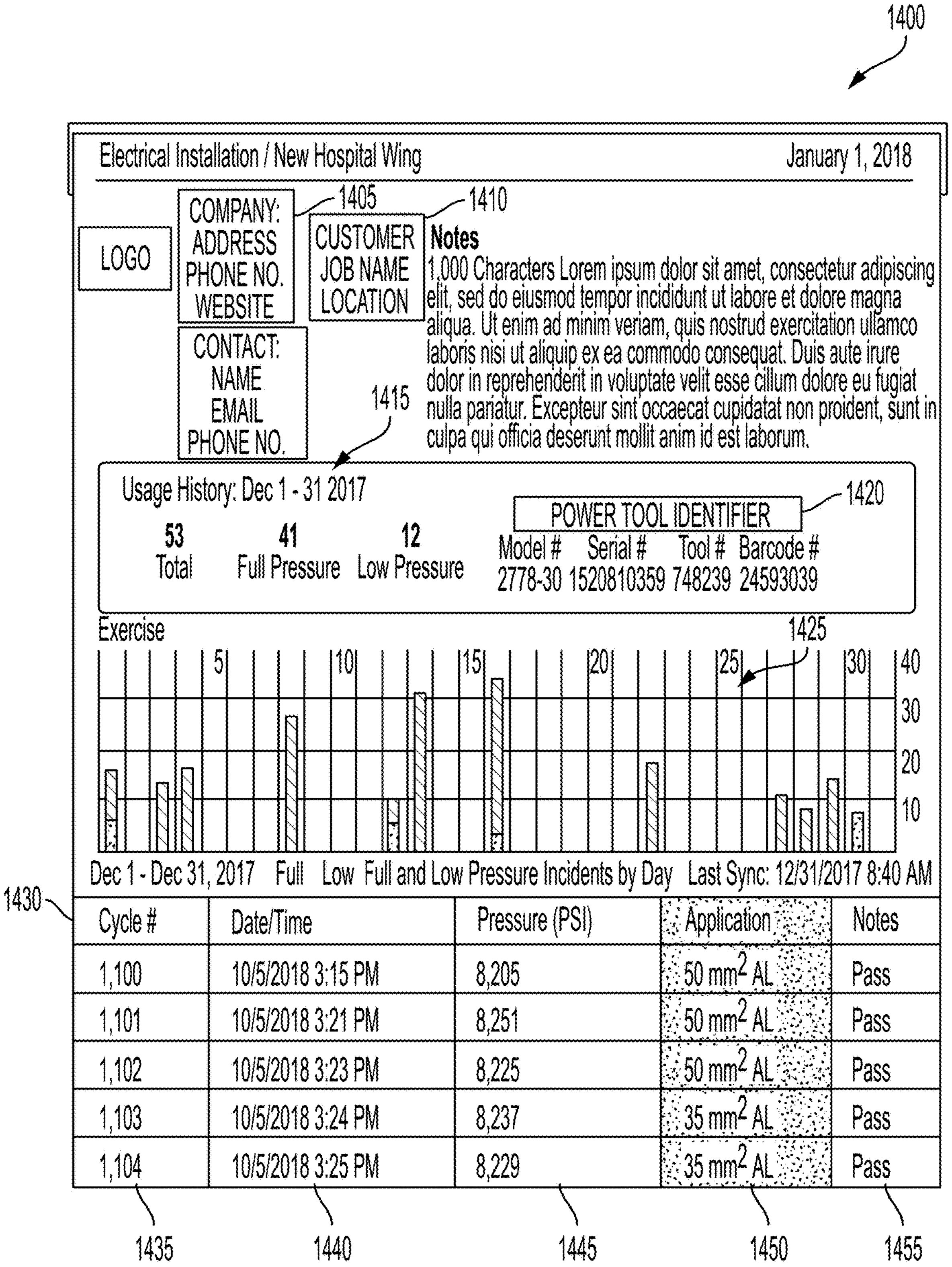
FIG. 14 illustrates an example report generated by a controller in accordance with embodiments described herein.

In some embodiments, the controller 500 generates a report including actions performed by the power tool 10 and the status of the actions performed by the power tool 10. For example, FIG. 14 provides an example report 1400 for a crimper. However, the report 1400 can be tailored to any type of power tool that performs an operation. The report 1400 includes, among other things, a service provider 1405, a location 1410, a usage history 1415, a tool identifier 1420, and a usage graph 1425. The service provider 1405 provides an indication of the company and the worker that performed the crimping application. For example, the company name, address, phone number, fax number, and website may be provided. The worker's name, email, and phone number may be provided, among other contact information. The location 1410 provides an indication as to where the crimping application was performed, such as the customer name, a job name (or other job identifier), a specific location the crimping application was performed, a location based on GPS signals associated with the power tool 10 or external device 705, and the like.

The usage history 1415 may provide an overall usage of the power tool 10 over a predetermined period of time. In the example illustrated in FIG. 14, the usage history 1415 provides a history of the power tool 10 from Dec. 1 to Dec. 31, 2017. However, other time ranges may also be provided. The usage history 1415 may include the tool identifier 1420, which may include a model number, a serial number, a barcode, a tool number, or some other alphanumeric identifier used to identifier the power tool 10. Additionally, a usage graph 1425 may provide a graph illustrating usage of the power tool 10 over the predetermined period of time. In some embodiments, the report 1400 includes some or all statistics used in determining the or evaluating a crimping application. Additionally, the report 1400 may include raw or encoded runtime sensor data used in determining or evaluating the crimping application.

The report 1400 may also include a table 1430 providing further usage history of the power tool 10. The table 1430 may include, among other things, a cycle number column 1435, a date and time column 1440, a pressure value column 1445, an application column 1450, and additional notes column 1455. The table 1430 may also include more or fewer columns. The cycle column 1435 provides a cycle number that may be used to identify a number of uses of the power tool 10 or identify a specific operation cycle of the power tool 10. The date and time column 1440 provides the date and time at which the corresponding cycle number was performed. The pressure value column 1445 may provide a maximum pressure value reached during the corresponding cycle number, an average pressure value reached during the corresponding cycle number, or the like. The application column 1450 provides the crimping application performed during the corresponding cycle number, and may include the type of accessories received by the power tool 10 in step 815 of the method 800. The additional notes column 1455 may include additional information regarding the corresponding cycle number, such as whether or not the performed application was a success (e.g., pass/fail). The table 1430 is not limited to these columns, and may include, among other things, the temperature of the power tool 10 (e.g., the motor temperature, the battery pack temperature, etc.) for a corresponding cycle number, the hydraulic work performed by the power tool 10 for a corresponding cycle number, an average battery voltage of the battery pack 580 for a corresponding cycle number, an average battery impedance of the battery pack 580 for a corresponding cycle number, whether an accessory mismatch was detected in step 830 of the method 800, and the like.

In some embodiments, the report 1400 may prompt a user to verify or fill in a performed crimping application. Additionally, a user may override, confirm, or classify crimping applications in the report 1400. For example, every crimping application on the report 1400 is a first type except for one (which is a second type). A user or viewer of the report 1400 may be prompted to label each crimping application as the first type, overriding the determination of the second type. In some embodiments, the prompt is provided via the external device 705. Additionally, the report 1400 may rank, prioritize, and/or filter crimping applications that have similar operating characteristics. Additionally, a user may provide inputs to the report 1400 and/or the power tool 10 to change qualification (or grading) behavior for determining whether an action is successful.

In some embodiments, the power tool 10 includes a display, such as, for example, a liquid-crystal display (LCD), a light-emitting diode (LED) screen, an organic LED (OLED) screen, a digit display, and the like. The display may be integrated into the housing of the power tool 10, may be detachable from the power tool 10, or completely separate (e.g., unattachable) from the power tool 10. The display may directly provide the report 1400 on the power tool 10.

The report 1400 provides a way to confirm that the correct crimping applications were performed at a given location. For example, should 60 500 MCM Cu crimps need to be performed at a first location, and 40 600 MCM Al crimps need to be performed at an adjacent location, the report 1400 can confirm the correct crimping applications were performed at each location, reducing or eliminating any need for an inspector or other third party to check that wiring was correctly performed.

Thus, embodiments provided herein describe, among other things, systems and methods for identifying power tool accessories.

What is claimed is:

1. A power tool comprising:

a power tool housing including an interface, the interface configured to receive a first accessory and a second accessory, the first accessory including a first identifier and the second accessory including a second identifier;

a sensor configured to detect one or more operating characteristics of the power tool;

a motor; and an electronic processor connected to the motor and a memory, the electronic processor configured to:

detect insertion of the first accessory into the interface, detect insertion of the second accessory into the interface, determine, in response to detecting that the first accessory is inserted into the interface, an accessory type of the first accessory based on the first identifier, determine, in response to detecting that the second accessory is inserted into the interface, an accessory type of the second accessory, determine whether the first accessory and the second accessory are mismatched based on the accessory type of the first accessory and the accessory type of the second accessory, lock, in response to the first accessory and the second accessory being mismatched, operation of the motor, unlock, in response to receiving an override input, operation of the motor, update, in response to receiving the override input, an accessory log indicating the first accessory and the second accessory are mismatched, determine first operating characteristics associated with the accessory type, perform a crimping operation, receive, while performing the crimping operation, a signal from the sensor indicative of the one or more operating characteristics of the power tool, determine whether the crimping operation is complete, compare, in response to the crimping operation being complete, the signal to the first operating characteristics, and determine whether the crimping operation is acceptable based on the comparison.

2. The power tool of claim 1, wherein:

the power tool includes a radio frequency identification reader;

the first identifier is a radio frequency identification tag; and the electronic processor is configured to determine the accessory type of the first accessory based on the radio frequency identification tag of the first accessory.

3. The power tool of claim 1, wherein the first accessory is one selected from a group consisting of a press ring, a crimping jaw, a crimping die, and a set of crimping jaws and crimping dies.

4. The power tool of claim 1, wherein:

the first identifier is a resistive element; and the electronic processor is configured to determine the accessory type of the first accessory by determining a resistance value of the resistive element.

5. The power tool of claim 1, wherein the electronic processor is further configured to:

provide, in response to the first accessory and the second accessory being mismatched, a notification via an indicator.

6. The power tool of claim 1, wherein the first identifier is one selected from a group consisting of a color of the first accessory, a pattern on the first accessory, a radio frequency identification tag of the first accessory, and a near field communication tag of the first accessory.

7. The power tool of claim 1, wherein the electronic processor is configured to:

determine whether the accessory type is compatible with the power tool by comparing the accessory type to a look-up table; and stop, in response to determining the accessory type is not compatible with the power tool, operation of the motor.

8. A method for operating a power tool, the method comprising:

detecting insertion of a first accessory into an interface, the first accessory including a first identifier;

detecting insertion of a second accessory into the interface, the second accessory including a second identifier;

determining, in response to detecting that the accessory is inserted into the interface, an accessory type of the accessory based on the identifier;

determining, in response to detecting that the second accessory is inserted into the interface, an accessory type of the second accessory;

determining whether the first accessory and the second accessory are mismatched based on the accessory type of the first accessory and the accessory type of the second accessory;

locking, in response to the first accessory and the second accessory being mismatched, operation of a motor of the power tool;

unlocking, in response to receiving an override input, operation of the motor; and updating, in response to receiving the override input, an accessory log indicating the first accessory and the second accessory are mismatched;

selecting operating parameters for a motor based on the accessory type;

performing a crimping operation by driving the motor based on the operating parameters;

determining whether the crimping operation is complete;

determining, in response to the crimping operation being complete, whether the crimping operation is acceptable; and generating a report including an indication of whether the crimping operation is acceptable.

9. The method of claim 8, wherein the first identifier is one selected from a group consisting of a radio frequency identification tag and a near field communication tag.

10. The method of claim 8, wherein:

the first identifier is a resistive element; and determining the accessory type of the first accessory based on the first identifier includes determining a resistance value of the resistive element.

11. The method of claim 8, wherein the method further comprises:

providing, in response to the first accessory and the second accessory being mismatched, a notification via an indicator.

12. A power tool comprising:

a power tool housing including an interface and an input device, the interface is configured to receive a first accessory and a second accessory, the first accessory including a first identifier and the second accessory including a second identifier;

a motor; and an electronic processor connected to the input device, the motor, and a memory, the electronic processor configured to:

detect insertion of the first accessory into the interface, detect insertion of the second accessory into the interface, determine, in response to detecting that the first accessory is inserted into the interface, an accessory type of the first accessory based on the first identifier, determine, in response to detecting that the second accessory is inserted into the interface, an accessory type of the second accessory, determine whether the first accessory and the second accessory are mismatched based on the accessory type of the first accessory and the accessory type of the second accessory, lock, in response to the first accessory and the second accessory being mismatched, operation of the motor, unlock, in response to receiving an override input, operation of the motor, update, in response to receiving the override input, an accessory log indicating the first accessory and the second accessory are mismatched, drive, in response to actuation of the input device, the motor to perform a crimping operation, determine, after the crimping operation is completed, whether the crimping operation was successful, and transmit a report indicating a type of the crimping operation and an indication of whether the crimping operation was successful, wherein the type of crimping operation is based on the accessory type.

13. The power tool of claim 12, wherein the electronic processor is further configured to:

provide, in response to the first accessory and the second accessory being mismatched, a notification via an indicator.

14. The power tool of claim 12, wherein the electronic processor is further configured to:

determine whether the accessory type is compatible with the power tool by comparing the accessory type to a look-up table; and stop, in response to determining the accessory type is not compatible with the power tool, operation of the motor.

15. The power tool of claim 1, wherein the electronic processor is further configured to:

select one or more operating parameters for the motor based on the accessory type.

16. The power tool of claim 1, wherein the one or more operating characteristics include at least one selected from a group consisting of a pressure applied by the accessory, a distance traveled by the accessory, and a motor current.

* * * * *